US010598412B2

(12) United States Patent
Jacobi

(10) Patent No.: US 10,598,412 B2
(45) Date of Patent: Mar. 24, 2020

(54) SUPPLEMENTAL HEAT TRANSFER APPARATUS FOR GEOTHERMAL SYSTEMS

(71) Applicant: Robert W. Jacobi, Indianapolis, IN (US)

(72) Inventor: Robert W. Jacobi, Indianapolis, IN (US)

(*) Notice: Subject to any disclaimer, the term of this patent is extended or adjusted under 35 U.S.C. 154(b) by 0 days.

(21) Appl. No.: 16/045,086

(22) Filed: Jul. 25, 2018

(65) Prior Publication Data

US 2018/0328633 A1 Nov. 15, 2018

Related U.S. Application Data

(63) Continuation of application No. PCT/US2017/015306, filed on Jan. 27, 2017.

(Continued)

(51) Int. Cl.
*F25B 30/06* (2006.01)
*F24F 5/00* (2006.01)
(Continued)

(52) U.S. Cl.
CPC .............. *F25B 30/06* (2013.01); *F24F 5/005* (2013.01); *F24T 10/00* (2018.05); *F25B 23/006* (2013.01); *F25B 25/005* (2013.01); *F25B 41/04* (2013.01); *F28D 21/0012* (2013.01); *Y02A 30/272* (2018.01); *Y02B 10/20* (2013.01);
(Continued)

(58) Field of Classification Search
CPC ......... Y02B 10/40; Y02E 10/10; F25B 30/06; F24F 5/005; F24T 10/00
See application file for complete search history.

(56) References Cited

U.S. PATENT DOCUMENTS 3,760,868 A 9/1973 Cywin
4,375,831 A 3/1983 Downing, Jr.
(Continued)

FOREIGN PATENT DOCUMENTS

JP 2002-310524 A 10/2002
WO WO 2014130545 8/2014
(Continued)

OTHER PUBLICATIONS

English Machine Translation of JP 2002310524A.

*Primary Examiner* — Ana M Vazquez
(74) *Attorney, Agent, or Firm* — Woodard, Emhardt, Henry, Reeves & Wagner, LLP

(57) ABSTRACT

The present invention provides improvements for heating and cooling of structures. In the exemplary embodiments reference is made to residential structures though light commercial buildings would be another option. The heat transfer systems of the exemplary embodiments are constructed and arranged as a way to provide supplemental heat transfer for geothermal systems. One improvement provided by the exemplary embodiments relative to current geothermal systems is the utilization of residential wastewater discharge as the heat sink. Another improvement provided by the exemplary embodiments relative to current geothermal systems is the installation method which can be performed at the same time when the geothermal system is being installed. By linking together these two system installations, cost savings should be realized.

29 Claims, 27 Drawing Sheets

Related U.S. Application Data

(60) Provisional application No. 62/288,571, filed on Jan. 29, 2016.

(51) Int. Cl.
    *F24T 10/00* (2018.01)
    *F28D 21/00* (2006.01)
    *F25B 23/00* (2006.01)
    *F25B 25/00* (2006.01)
    *F25B 41/04* (2006.01)

(52) U.S. Cl.
    CPC ............... *Y02B 10/24* (2013.01); *Y02B 10/40* (2013.01); *Y02B 30/542* (2013.01); *Y02B 30/547* (2013.01); *Y02B 30/566* (2013.01); *Y02E 10/10* (2013.01)

(56) References Cited

U.S. PATENT DOCUMENTS

| | | | |
|---|---|---|---|
| 4,466,256 A | 8/1984 | MacCracken | |
| 5,816,510 A * | 10/1998 | Earle, III | E03F 5/22 241/46.01 |
| 6,412,550 B1 | 7/2002 | McLaughlin | |
| 6,688,129 B2 * | 2/2004 | Ace | F24F 5/0046 62/260 |
| 8,815,093 B2 | 8/2014 | Mahony | |
| 9,038,408 B2 | 5/2015 | Sabo | |
| 2006/0242983 A1 | 11/2006 | Spadafora et al. | |
| 2007/0209380 A1 | 9/2007 | Mueller et al. | |
| 2010/0139886 A1 | 6/2010 | Desmeules | |
| 2010/0236750 A1 * | 9/2010 | Naneff | F25B 30/06 165/45 |
| 2012/0255706 A1 | 10/2012 | Tadayon et al. | |
| 2012/0261091 A1 | 10/2012 | Krecke | |
| 2013/0037236 A1 | 2/2013 | Saunier | |
| 2013/0228309 A1 | 9/2013 | Wood | |
| 2014/0048244 A1 * | 2/2014 | Wallace | F28F 27/00 165/253 |
| 2014/0284275 A1 * | 9/2014 | Boccato | E04H 3/08 210/645 |
| 2015/0013370 A1 | 1/2015 | Wiggs | |

FOREIGN PATENT DOCUMENTS

| | | |
|---|---|---|
| WO | WO 2015/066764 | 5/2015 |
| WO | WO2015/136156 | 9/2015 |

* cited by examiner

SUPPLEMENTAL HEAT TRANSFER APPARATUS FOR GEOTHERMAL SYSTEMS

CROSS REFERENCE TO RELATED APPLICATION

This application is a continuation of PCT Application No. US2017/015306 filed on Jan. 27, 2017, which claims the benefit of U.S. Provisional Patent Application No. 62/288,571 filed Jan. 29, 2016. Both of which are incorporated herein by reference.

BACKGROUND OF THE INVENTION

The heating and cooling of structures can be accomplished in a variety of ways, using a variety of primary systems which include a variety of primary equipment. There are other systems and other equipment which are designed and arranged to provide supplemental heat transfer which may be either heating or cooling. The specific nature of the heat transfer, including the transfer direction, depends on whether supplemental heating or cooling is the intended objective of the heat transfer. In the context of the exemplary embodiment of the present invention the referenced structures are selected to be residential structures. One such supplemental heat transfer system utilizes geothermal heat transfer either to or from the earth's mass as the selected heat sink. Circulation of a heat transfer fluid through the geothermal heat transfer system (flow conduits or piping buried at a desired depth) results in the following forms of heat transfer.

In the warmer months a warmer fluid exits from the residential structure, building, house, etc. and flows or circulates through the geothermal system with the earth's mass, at the operating depth of the system, being at a lower temperature. This temperature difference results in heat transfer from the cooler earth's mass. Accordingly, the circulating fluid re-enters the residential structure at a lower temperature than when it left the residential structure.

In the cooler months a cooler fluid exits from the residential structure and flows or circulates through the geothermal system with the earth's mass, at the operating depth of the system, being at a higher temperature. This temperature difference raises the temperature of the circulating fluid such that the circulating fluid re-enters the residential structure at a higher temperature than when it left the residential structure.

In order to visualize the above and understand the heat transfer which is able to occur, consideration of some relative numbers, as but one example, may help. These relative numbers are for example only and while they may be close to the actual temperatures, these numbers are simply for reference. In this regard, assume an earth mass temperature at a 6 foot depth of 70 degrees F. Next assume that in the warmer months the warmer fluid exiting the residential structure is at 90 degrees F. This 20 degree difference results in heat transfer from the circulating fluid thus lowering the temperature of the circulating fluid before its re-entry into the residential structure. In the cooler months, still using reference numbers for example only, assume that the exiting fluid is at 60 degrees F. Assume further that the earth mass temperature at a 6 foot depth is still 70 degrees F. This 10 degree difference results in heat transfer to the circulating fluid thus raising the temperature of the circulating fluid before its re-entry into the residential structure.

The geothermal heat transfer system described above is not limited to the heating and cooling of any particular circulating fluid. The heat transfer principles described above which are associated with a geothermal system are applicable to any setting or environment where there is an available heat sink which provides a generally stable temperature which is within the likely range of heating and cooling temperatures to be expected, such that heat transfer will occur. One concern for any heat transfer system which is to be installed for use with a residential structure is the cost. There are equipment costs and installation costs. These costs need to be considered relative to the energy savings to be expected by the owner.

Based on the above system description, it is envisioned that there are two areas for improvement in the supplemental heating and cooling of residential structures. One area for possible improvement is directed to finding a suitable heat sink with a generally stable temperature within the range for cooling heat transfer in the warmer months and for warming heat transfer in the cooler months. Another area for possible improvement is directed to finding construction short cuts which provide cost-cutting techniques for the builder when the residential structure is being constructed.

The present invention provides an improvement in the design and construction of a supplemental heat transfer arrangement for use in conjunction with a geothermal system. A further improvement is provided as part of the original construction such that the supplemental heat transfer arrangement is able to be installed when the geothermal system is being installed. More specifically, the present invention is directed to the integration of a pressure sewer wastewater discharge system and a geothermal loop as further explained below.

The wastewater discharged from a residential (or light commercial) building is a potential source of renewable, low grade energy suitable for use with compression based HVAC heating and cooling and domestic hot water heating. Recent technology advances in pressure sewer (pumped wastewater discharge, not gravity sewer discharge) applications for the sewer lateral piping joining a building to the municipal sewer collection system using horizontal boring technology offers an opportunity for a design improvement. More specifically it offers a way to couple a closed loop geothermal piping system with the pressure sewer wastewater discharge lateral piping using the surrounding soil to provide a renewable energy boost to the geothermal loop heat transfer capacity.

The typical temperature of the wastewater contained in the in-ground storage tank in the Midwestern United States is approximately 70 degrees F. In the cooling mode during the summer months, typical discharge temperatures off of the condenser to the geothermal loop are approximately 90 degrees F. In summer months when cooling is required, the wastewater fluid contained in the pressure sewer lateral will absorb heat from the surrounding soil and geothermal loop, raising the temperature of the wastewater while lowering the temperature of the geothermal cooling loop.

As the wastewater flows into the branch and main collection system lines, this heat will be rejected into the cooler soil surrounding the piping until the wastewater temperature reaches an equilibrium with the surrounding soil temperature. During the winter months the heat in the approximately 70 degrees F. pressure sewer discharge wastewater will be rejected into the cooler surrounding soil and the geothermal fluid in the pipe will leave the evaporator at approximately 60 degrees F. and below. Therefore the pressure sewer discharge wastewater will help raise the temperature and increase the efficiency of the geothermal loop and compressor based heating system. During the coldest winter months an auxiliary heating source or boiler system may be required to add heat to the geothermal loop fluid before it enters the evaporator to provide entering temperatures required for the compression based heating system.

The present invention takes a holistic approach to the integration of in-ground municipality supplied utilities (water, wastewater, reuse water and natural gas) for hydronic HVAC water heating, potable and non-potable water use. The present invention takes advantage of new horizontal "trenchless" boring capabilities, but can also be used with trenched technology for installation. The present invention uses the inherent characteristics of a wastewater pressure sewer lateral pipe, potable water, and reuse water service connection piping design to co-install and provide thermal benefit to a geothermal HVAC in-ground piping loop system.

BRIEF SUMMARY OF THE INVENTION

The present invention provides improvements for heating and cooling of structures. In the exemplary embodiments reference is made to residential structures though light commercial buildings would be another option. The heat transfer systems of the exemplary embodiments are constructed and arranged as a way to provide supplemental heat transfer for geothermal systems. One improvement provided by the exemplary embodiments relative to current geothermal systems is the utilization of residential wastewater discharge as the heat sink. Another improvement provided by the exemplary embodiments relative to current geothermal systems is the installation method which can be performed at the same time when the geothermal system is being installed. By linking together these two system installations, cost savings should be realized.

Many residential structures (e.g. houses) have a 4 inch PVC wastewater discharge pipe. This wastewater discharge pipe leaves the house and enters the earth below the frost line. The discharge pipe becomes the sewer lateral and connects to the main or branch sewer piping at the street. Sometimes the discharge pipe connects to a septic tank when municipal sewers are not being used.

In basic terms, a pressure sewer system as referenced herein is a package station that includes a grinder pump, storage tank and starter/control panel. The same 4 inch PVC discharge pipe connects directly to the grinder pump station which is installed in the ground in proximity to the house. Wastewater enters the station at atmospheric pressure. The discharge from the station is to a 1.25 inch pressurized pipe that is installed below the frost line connecting to the collection piping infrastructure at the street.

Typical gravity lateral piping is installed in a trench and if there is a problem in the piping and if it cannot be "snaked", then the lateral piping must be dug up and inspected/repaired/replaced and the sewer put back in service. A pressure sewer grinder station discharges into a plastic pipe that is installed using a horizontal boring machine.

The exemplary embodiments of the present invention are based upon the fact that the discharge wastewater temperature is near the ambient residence temperature and is a blend of hot and cold water. In this manner, the wastewater temperatures going into the tank have a design temperature of approximately 70-72 degrees F. Therefore, the wastewater discharge from a home can be used as a thermal source. One feature of the exemplary embodiments comes from the fact that a pressure sewer system uses a 1.25 inch pipe and may be horizontally bored. For a horizontal boring machine a 1.25 inch pipe is relatively small. Depending on the model, boring machines can be used for quite large pipes and thus in this instance it is envisioned that multiple piping or multiple lines could be pulled together at one time. More specifically in terms of the timing and cost savings relative to the thermal systems disclosed herein, it is possible at the time the pressure sewer discharge pipe is being installed between the house and the street to include an additional pair or pairs of 1.25 inch pipe for (geothermal) heat transfer.

Geothermal heat transfer is normally accomplished with a vertical pipe to first get to a desired or proper depth down into the soil that is less affected by outdoor ambient temperatures. As but one example, standard pressure sewer lateral piping in the state of Indiana is typically set at between 5 and 6 feet in depth. It is relatively easy for a pressure sewer in combination with a geothermal installation to go a little deeper such as to 10 feet and have more stability in the ground thermal mass and its expected temperature. On average, a typical house discharges 310 gallons of wastewater every day, a number which comes from and is consistent with various state design guidelines, such as for the State of Indiana. In terms of the supplemental heat transfer which is provided by the various embodiments disclosed herein, if it is possible to add 10 degrees of cooling in the summertime and to add 10 degrees of heat in the wintertime to the integrated geothermal piping system or geothermal loop, this would equate to a boost to the natural geothermal capacity of approximately 26,000 BTU's per day and the mean temperature of approximately 70-72 degrees F. wastewater is ideal for either summertime air conditioning or wintertime heating.

A similar strategy could be used with the city water/potable water supply going to a house. With this pipe being bored again with one or two pairs of 1.25 inch pipe for geothermal boost, heat transfer savings could be realized. The pressure sewer and city water geothermal sources could be joined to provide more geothermal capacity. In addition, rainwater capture and reuse water could be integrated as part of the exemplary embodiments of the present invention.

This Summary and the exemplary embodiments of the present invention are directed to a system to optimize the installation costs and operational performance of the in-ground privately owned utilities contained in residential building lots to assist in HVAC heating/cooling, hot water production and non-potable water usage for the residence. The exemplary embodiments of the present invention joint separate piping systems connecting to municipal utilities at the street for water and wastewater and when available reuse water and district heating and/or cooling water. Natural gas service connection piping can also be used; however, natural gas lines provide insignificant additional thermal benefit beyond the earth's natural geothermal capacity.

In-ground residential lot utilities (that are/can be horizontally bored) from municipal or central systems include:
Wastewater
Water
Natural gas
Reuse water (purple pipe)
District heating (low temperature)
District cooling
In-ground residential lot utilities that originate at residence include:
Geothermal heating/cooling loop
Rainwater recovery/irrigation piping Snow and ice melt system heating for walkways, driveways, patios and decks Non-potable reuse water for irrigation, car washing, equipment wash/rinse and wash down water Sump pump dewatering for use as non-potable water Heat recovered from residential combined heat and power (CHP) generators for domestic hot water production and hydronic HVAC heating.

Additional aspects, features and characteristics of the present invention are presented as follows:

1) The invention uses the inherent characteristics of a pressure sewer lateral system including:
   Collection and storage of the wastewater outflow from a building at approximately 70 degrees F.
   Employing a grinder pump
   And subterranean discharge lateral piping and control components
   To connect to a municipal (or other type of) sewage collection system
2) To the basic pressure sewer lateral system the invention adds:
3) Two or more geothermal loop pipes that are bundled with the discharge pressure sewer lateral piping to form a coaxial, double wall, multiple tube, heat exchanger surrounded by earth which is used as a geothermal heat sink.
4) Additional geothermal loop pipes, two or more, can be installed in one or more additional horizontal bored holes to add capacity to the geothermal loop system.
5) In addition, the geothermal loop system uses a separate pumping system to pump water or water with antifreeze and a control system with valves and sensors to control the flow through the geothermal loop system and interface and control the pressure sewer system to optimize the heat recovery from discharge wastewater.
6) The invention's coaxial, double wall, multi-tubular heat exchanger concept can be used to recover heat from:
   Onsite utilities including:
   Rainwater capture/storage systems for irrigation and non-potable uses or, with additional components, potable water production
   Sump pumps and dewatering pump flows
   Connection to municipal utilities including:
   Potable water lateral piping system
   Reuse water (purple pipe) lateral piping system
7) The outdoor geothermal loop system can be extended indoor to supply a heat source to water-to-water water source heat pumps, chillers, heater/chillers and reversing loop heater/chillers and water-to-air water source heat pumps, water-cooled direct expansion air conditioning, VRF and VRV systems.
8) When the building lot or budget will not support a 100 percent capacity, geothermal loop heat source system and auxiliary boiler and/or solar thermal heating system can supply full or supplemental heating capacity to boost geothermal loop heating capacity and/or to directly supply heat to the separate, independent, indoor, hydronic HVAC heating/cooling loop with its own pumping and control system. This is also coupled with an auxiliary heat rejection unit like a dry or adiabatic fluid cooler to add heat rejection capacity to the geothermal loop for HVAC cooling.
9) When an auxiliary solar thermal system is used with piping and control modifications during sunny winter days when HVAC heating is required and after the HVAC heating requirement is met, the solar thermal system can be used to boost the temperature of the geothermal loop and store solar thermal heat in the earth which will act as a heat sink.
10) With piping and control modifications, the auxiliary dry or adiabatic fluid cooler can be used during cool, dry bulb or wet bulb temperature evening to use the ambient air source to cool the geothermal loop and the surrounding earth will provide cool storage.
11) During mild weather the nighttime cool storage can be used for daytime sensible only "free cooling" without the need or expense to operate compressors when the geothermal outdoor loop is directly connected to the indoor hydronic HVAC loop.
12) The various systems and components as described above can be mixed and matched in any number of combinations depending on geothermal and

DETAILED DESCRIPTION OF THE INVENTION

Figure 1A:
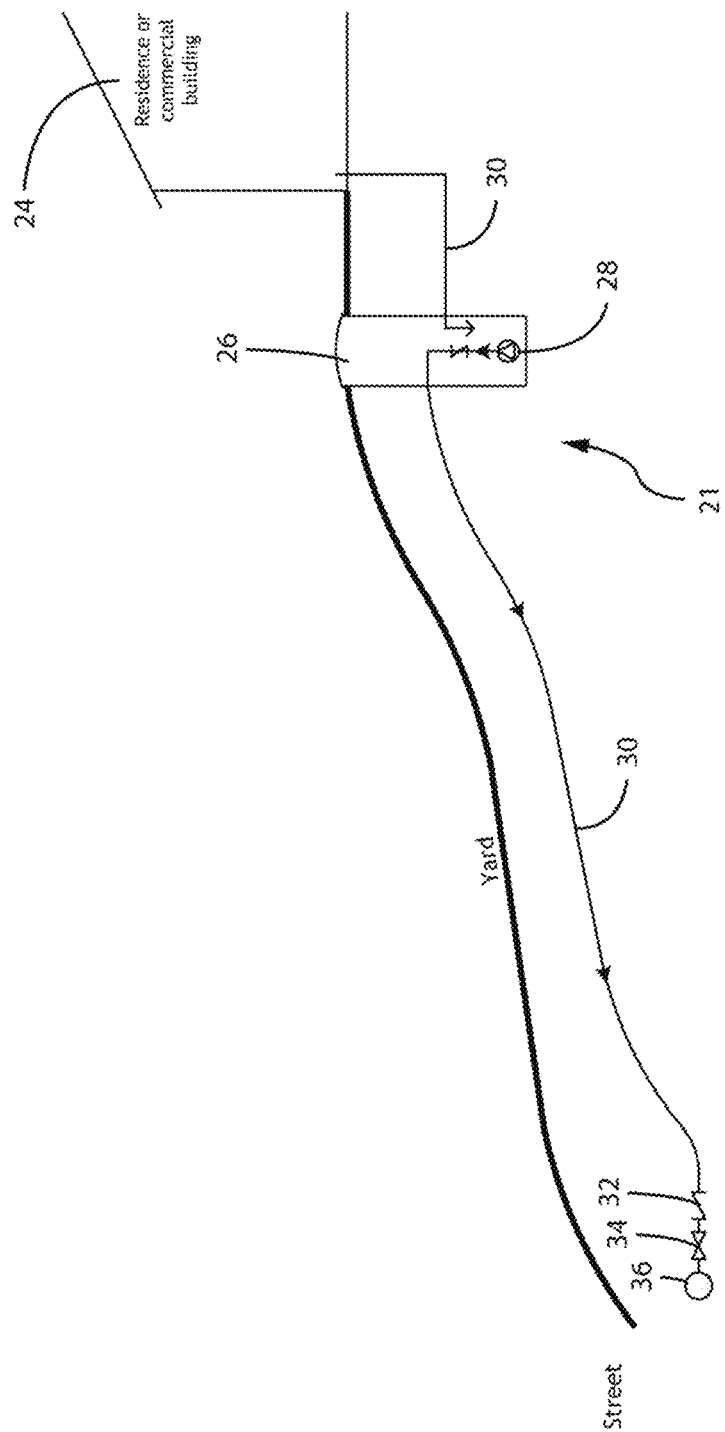
FIG. 1A is a diagrammatic illustration of a pressure sewer wastewater discharge system.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Before providing a more detailed description of the individual drawing illustrations, the following overview of selected drawing features is provided.

FIG. 1B

The invention is based on combining a pressure sewer with a geothermal loop using a multiple tube, coaxial, double wall heat exchanger with counter flow/parallel flow design for most loops with the surrounding earth adding geothermal energy. This figure Includes a control panel and pump for geothermal loop and control interface for both the pressure sewer lateral and geothermal loop. Excavation for piping and control takes place in the ground by the residence (30, 46, 48), at the grinder pump station (26) and at the connection point between the pressure sewer lateral and the municipal sewer connection system (36). Further included is a wastewater storage vessel that can hold daily wastewater outflows from the residence. The control system synchronizes the pressure sewer discharge pump (28) operation to coincide with the geothermal loop pump (46) operation for peak efficiency.

FIG. 2

This embodiment combines pressure sewer to geothermal loop heat transfer with additional loops of geothermal only to earth heat transfer. Shown are two loops, though any number of geothermal loops could be used, the total number of loops is only limited by capacity requirements and amount of acreage available for horizontal loops.

FIG. 7

This embodiment adds other renewable energy heat sources like captured rainwater or sump pump discharge water to boost geothermal loop capacity.

FIG. 8

This embodiment adds municipally supplied potable water or reuse water heat recovery to boost geothermal heat transfer.

FIG. 9

This embodiment adds additional heat transfer by extending the geothermal loop to recover heat from the pressure sewer collection system near the street by the edge of the property line.

FIG. 10

This embodiment adds an indoor water-to-water heater/chiller with a second water loop serving the indoor hydronic HVAC system for heating (winter) or cooling (summer) with valving to redirect the geothermal loop flow and indoor hydronic HVAC loop flow to either the evaporator or condenser. In the winter (residence heating mode) valves direct the evaporator flow to the geothermal loop to absorb heat from discharge sewage and the earth for the chiller to supply a heat source for the condenser flow to transfer heat to the indoor loop to provide HVAC heating. In the summer (residence cooling mode) valves direct condenser flow to the geothermal loop to reject heat into discharge sewage (or other renewable heat sources) and the earth while the indoor HVAC loop flows through the evaporation to make chilled water to cool the residence. The reversing flow direction of the indoor hydronic HVAC loop and the outdoor geothermal loop is accomplished by repositioning valves V-1 through V-8 from FIG. 9 versus FIG. 10.

FIG. 11

This embodiment adds a heat exchanger to directly recover heat from the condenser to preheat the water in the domestic hot water heater.

FIG. 12

This embodiment adds a closed circuit air or adiabatic fluid cooler that acts as a supplement to the geothermal earth coupled heat rejection system. This is primarily used on the warmest summer days.

FIG. 13A

This embodiment adds a 2 coil (top and bottom) heat exchanger in an indirect domestic hot water storage tank with the bottom "preheat" coil recovering heat from the heater/chiller in both heating and cooling modes of operation. Further included is an auxiliary heating system consisting of a boiler 662 and a solar thermal heating system with interconnecting piping and control valves with multiple modes of operation.

1. With pump 656 operational and valve 679 open to the domestic hot water heater piping and the top "final" heating coil, the solar thermal system 660 in sunny weather can maintain proper domestic hot water temperature.
2. With pump 658 operational and valve 679 open to the domestic hot water heater top "final" heating coil, the boiler 662 can either add additional heat to the solar thermal water temperature or solely provide the heat source for final heating of domestic hot water.
3. With valve 679 open to the HVAC heating loop with either or both pump 656 or pump 658 operating then when valve 677 opens, the boiler and/or the solar thermal system can add heat to the geothermal loop water going to the heater/chiller evaporator to increase the capacity and outlet temperature other discharge water from the condenser.
4. With valve 679 open to the HVAC auxiliary heating loop with either or both pumps 656 or 658 then when the valve opens the boiler and/or the solar thermal system can add heat directly to the indoor HVAC hydronic loop providing hot water for HVAC heating.

Figure 13A:
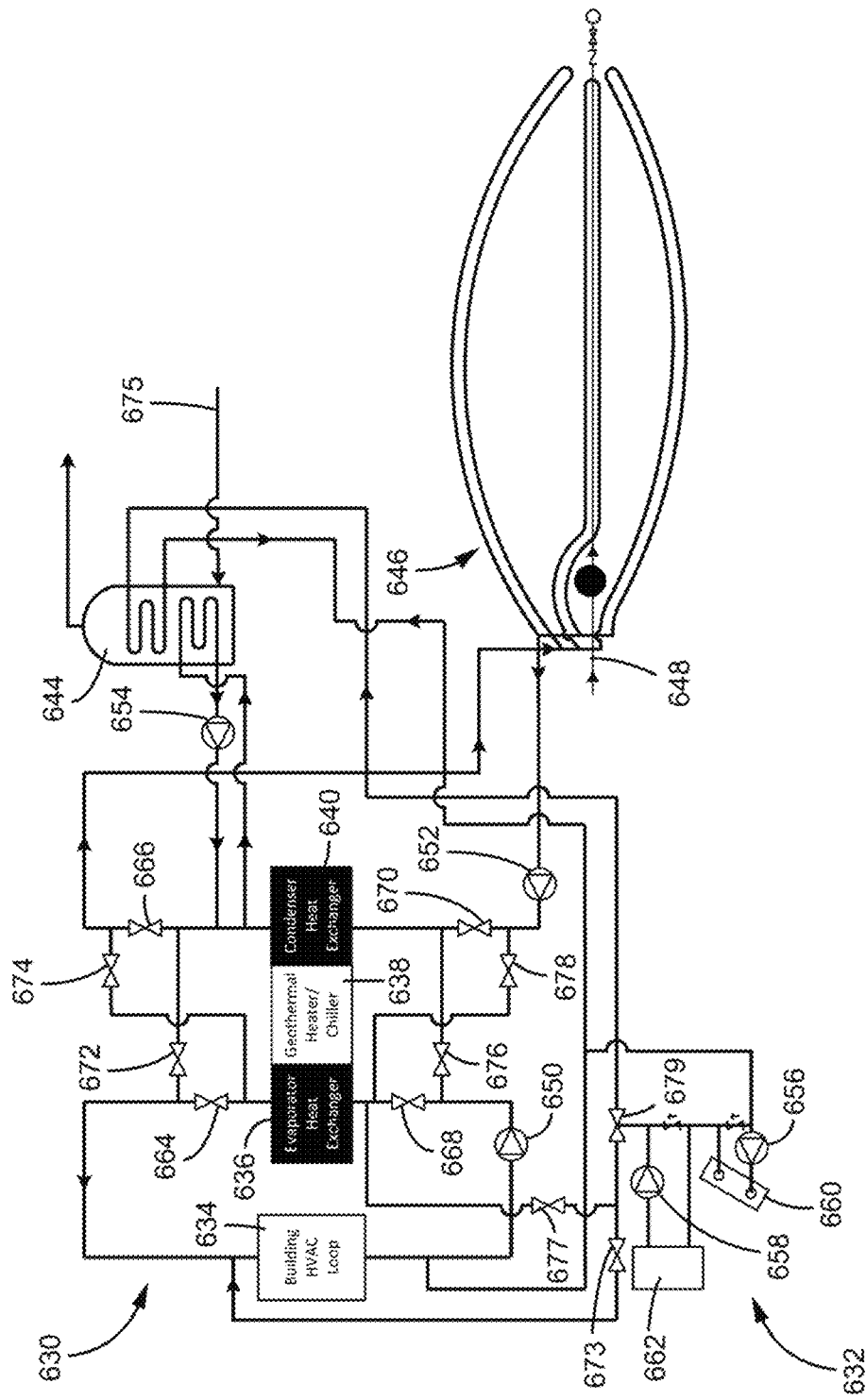
FIG. 13A is a diagrammatic illustration of another exemplary embodiment of a supplemental heat transfer apparatus according to the present invention.
Figure 13B:
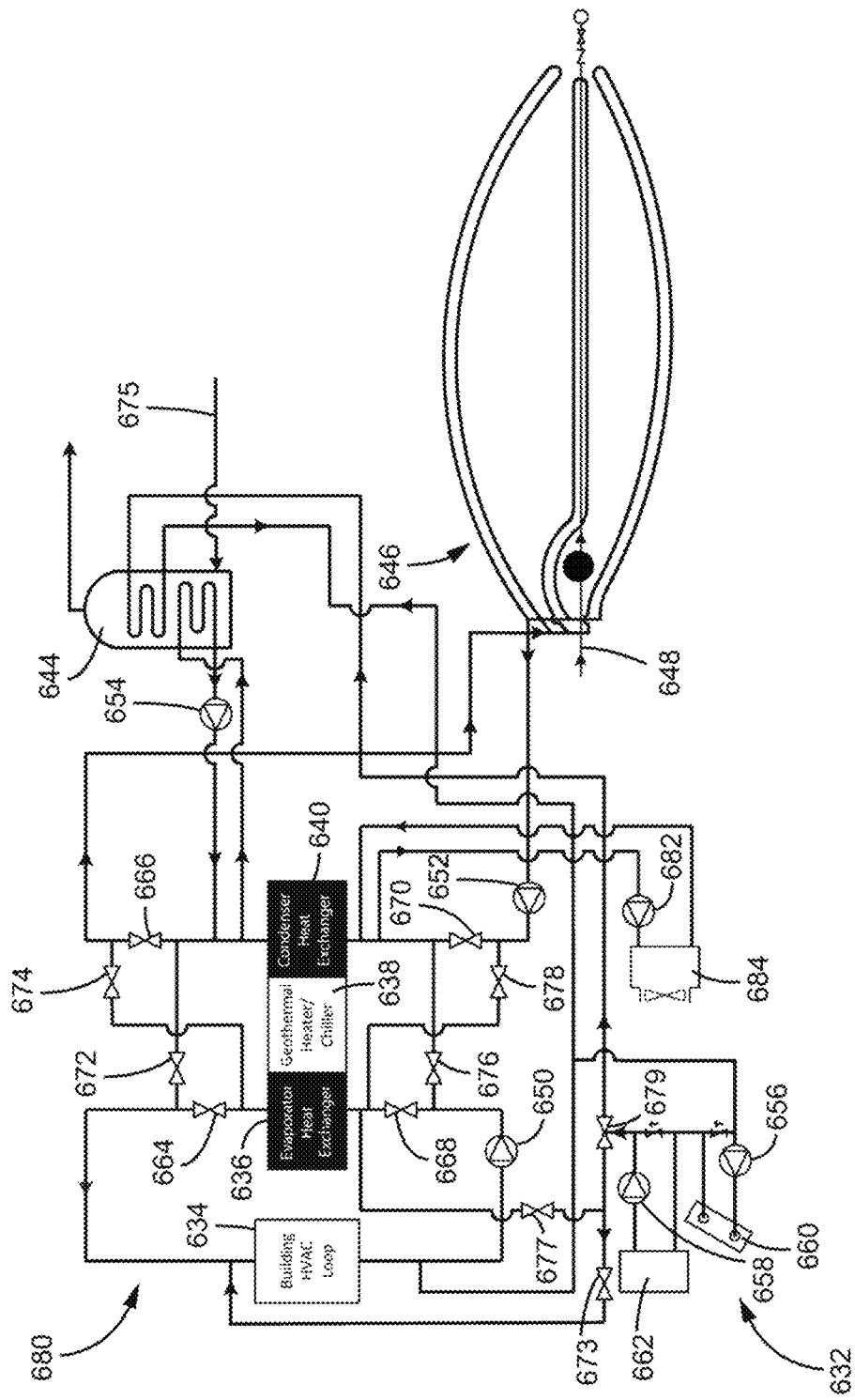
FIG. 13B is a diagrammatic illustration of another exemplary embodiment of a supplemental heat transfer apparatus according to the present invention.

FIG. 13B This embodiment adds a pump 682 and a dry or adiabatic fluid cooler 684 with associated piping as an auxiliary heat rejection source to further cool the geothermal loop water before it enters the condenser when the heater/chiller is in the cooling mode.

FIG. 13C

This embodiment adds a control valve and with pump 656 operational and 693 open to the new piping that interconnects the solar thermal system to the geothermal loop excess capacity solar heat can be stored in the geothermal loop and the surrounding earth as a heat sink on sunny days in the winter.

FIG. 13D

This embodiment adds control valve 698 to allow the dry or adiabatic fluid cooler 684 and pump 682 to, during cool/cold nights, send cool/cold water to the geothermal loop and absorb heat from the surrounding earth to provide cool storage for more efficient daytime cooling.

FIG. 13E

Figure 13C:
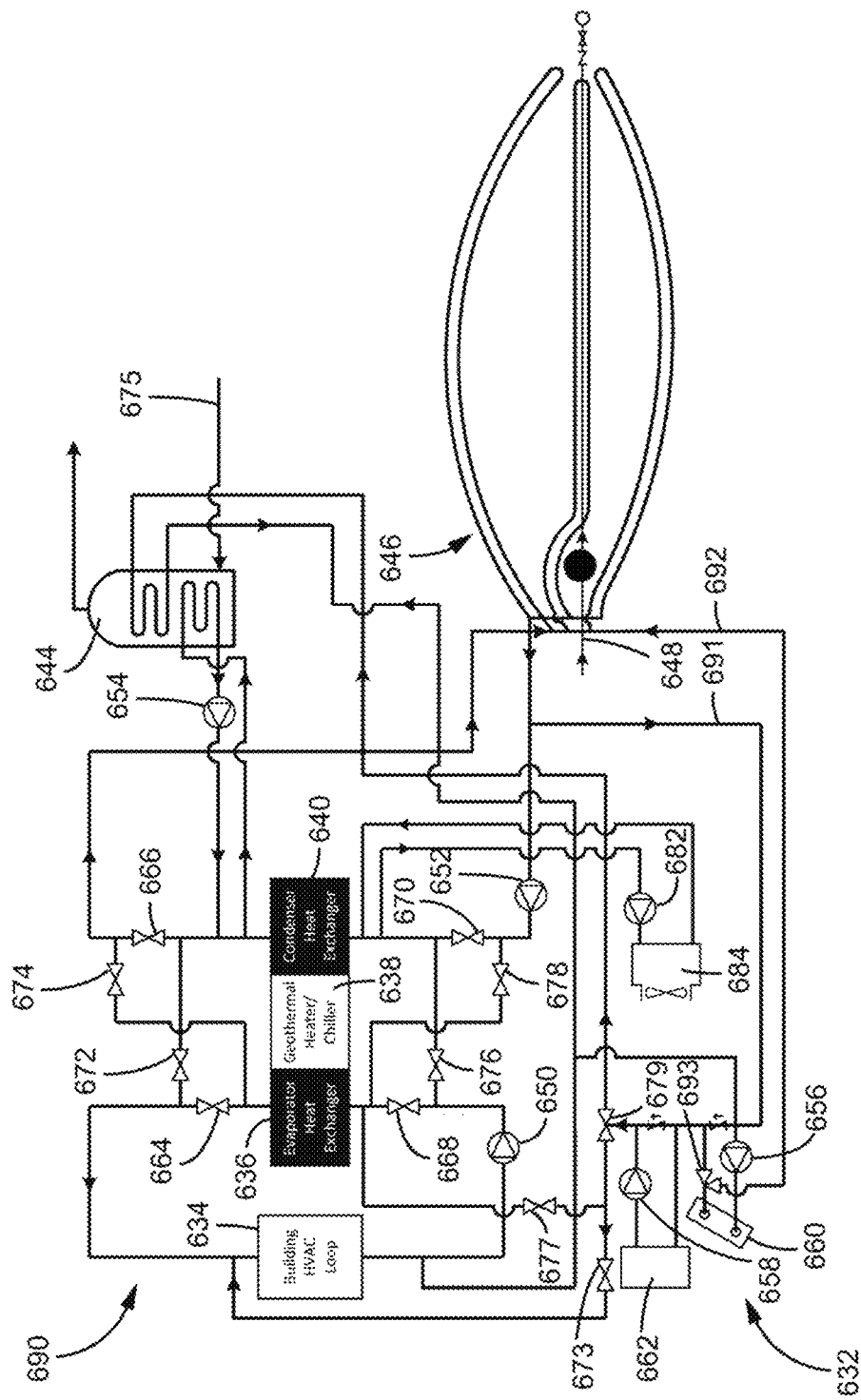
FIG. 13C is a diagrammatic illustration of another exemplary embodiment of a supplemental heat transfer apparatus according to the present invention.
Figure 13D:
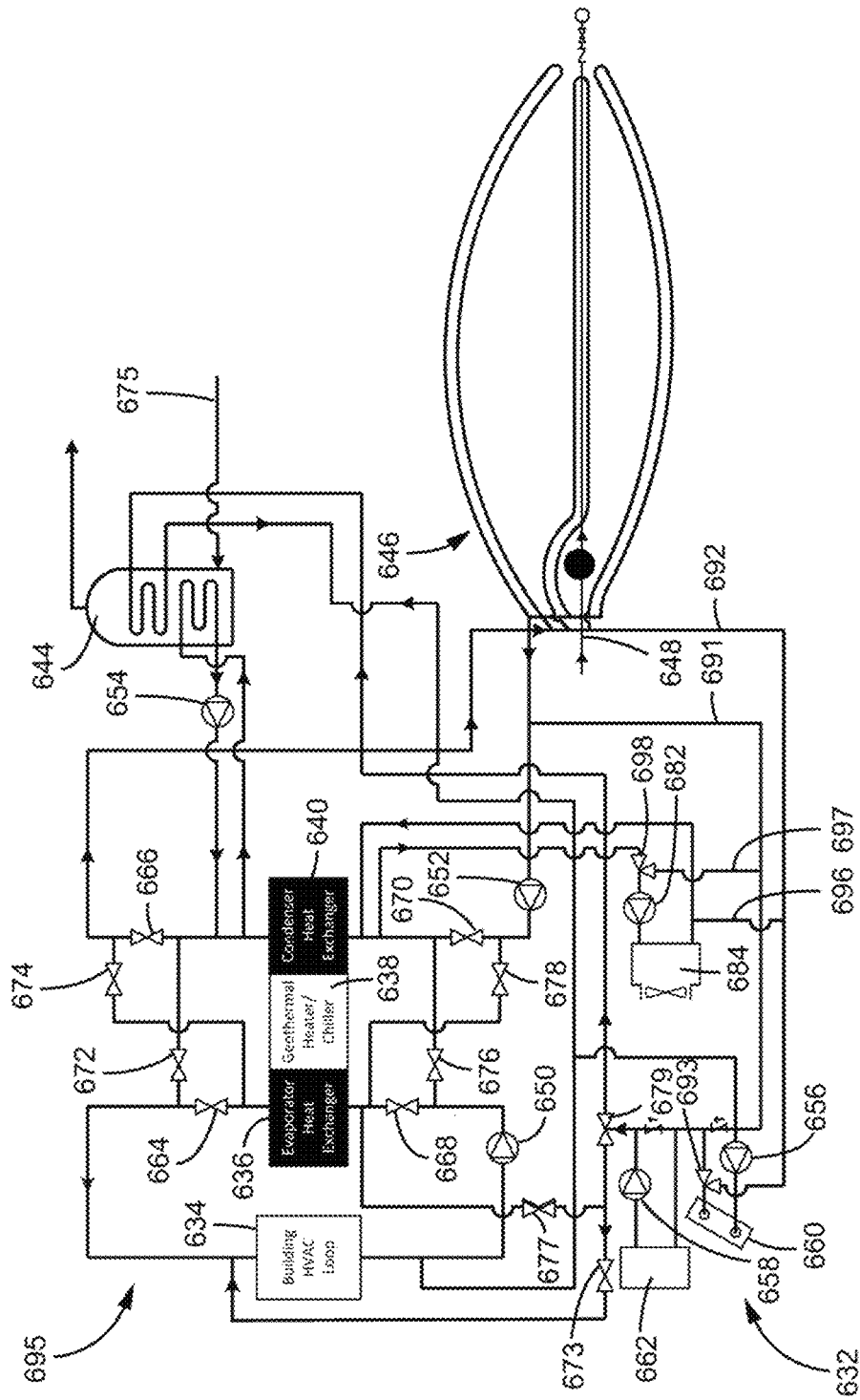
FIG. 13D is a diagrammatic illustration of another exemplary embodiment of a supplemental heat transfer apparatus according to the present invention.
Figure 13E:
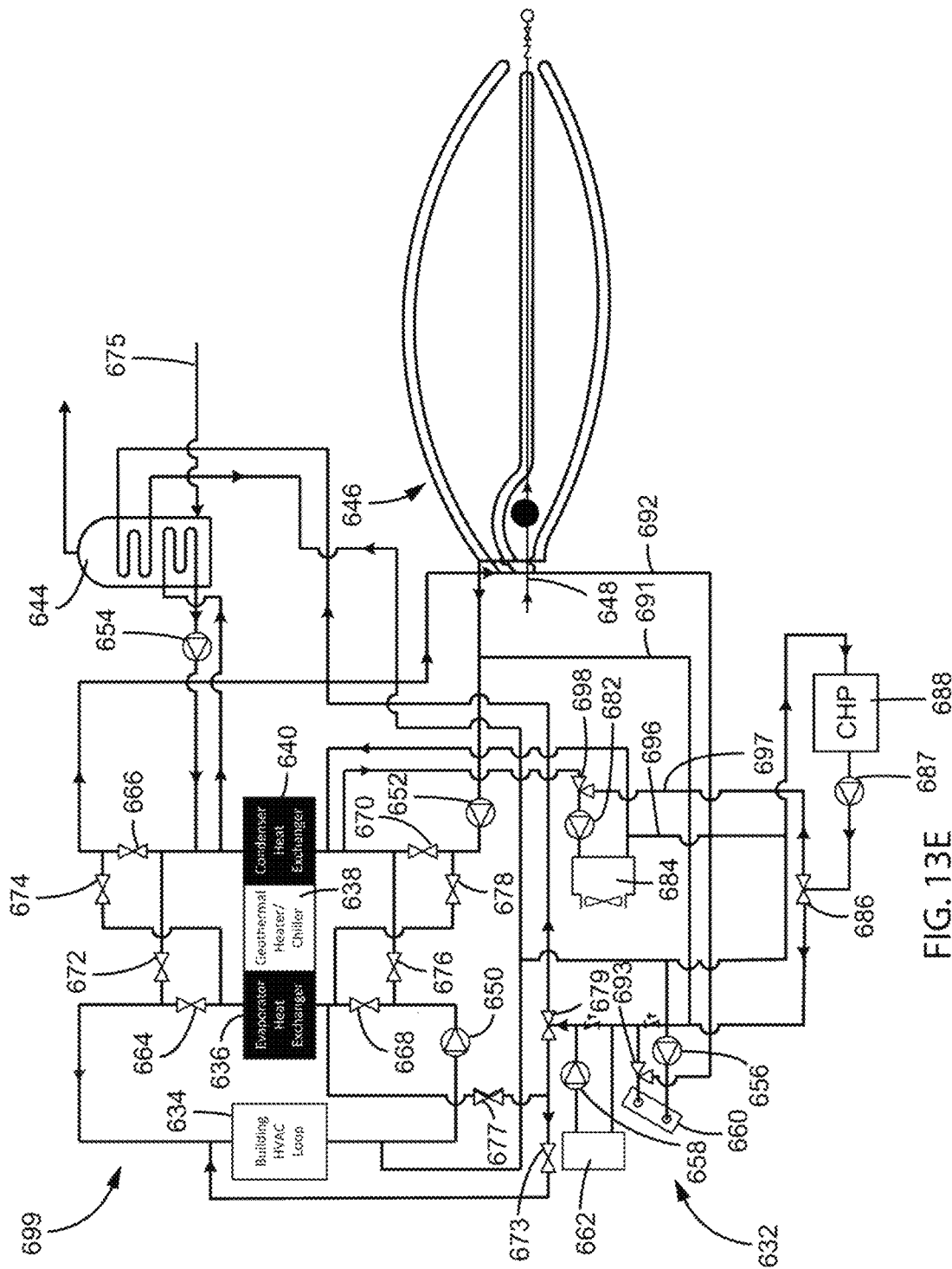
FIG. 13E is a diagrammatic illustration of another exemplary embodiment of a supplemental heat transfer apparatus according to the present invention.

In addition to the auxiliary heating from the boiler and/or solar thermal system from 13A, FIG. 13E adds a combined heat and power generator (CHP) that can provide base load, supplemental or standby power while recovering the waste heat for domestic hot water heating year round and using recovered heat for HVAC hydronic heating in cold months.

With CHP the dry or adiabatic fluid cooler can be sized to reject heat from the CHP when HVAC heating is not required.

FIG. 14

This embodiment extends the outdoor geothermal loop indoor with the geothermal loop pump 746 circulating the geothermal source flow to one or more water-to-air water source heat pump(s) 748 (736) which in the cooling mode hot discharge gas refrigerant flow to the condenser and the geothermal loop absorbs the rejected heat. In addition, a pump 748 and a dry or adiabatic fluid cooler 752 provides auxiliary heat rejection capacity to add additional cooling capacity to the geothermal loop. The addition of control valves and a hydronic water-to-air coil (not shown) can be added to the airside discharge of the water source hat pump to use cool water from the geothermal loop or the dry or adiabatic free cooler to provide "sensible-only" coiling, on cool/cold nights in low cooling load times of the year. In addition, as in FIG. 13D, control valves and piping (not shown) can be added to FIG. 14 to allow the dry or adiabatic free cooler on cool/cold days and evenings to cool the geothermal loop and the surrounding earth.

FIG. 15

In this embodiment the refrigerant in the water source heat pump 836 changes direction in the heating mode and the hot refrigerant flow is now to the air heat exchanger where room air is circulated across the coil to heat the residence. The geothermal loop flows to the water-to-water heat exchanger that is now an evaporator and absorbs heat from the geothermal loop. In addition, as with FIG. 13A, an auxiliary boiler or solar thermal heat source can add heat to the geothermal loop and increase the water temperature entering the evaporator to increase the water source heat pump heating capacity. The addition of control valves, piping and a hydronic water-to-air coil (not shown) can be added to the airside discharge of the water source heaty pump to use the boiler or solar thermal system coupled to the hydronic coil to directly heat the residence using the fan, but with or without the cooperation of the compressor. With an operational solar thermal system, this would be a type of "free heating" system. In addition, as in FIG. 13C, control, valves and piping (not shown) could be added to FIG. 15 to allow the solar thermal system, on sunny days, to store heat in the geothermal loop and surrounding earth as a heat sink.

FIG. 16

This embodiment builds on all previous FIGS. 1-15 to include: piping, pumping and control to:

1. A horizontally bored geothermal loop.
2. The horizontally bored geothermal loop coupled with recovered heat from a sustainable energy source such as residential wastewater transferred through a pressure sewer lateral or other renewal energy utilities.
3. Auxiliary hybrid heating system boiler and/or solar thermal system.
4. Auxiliary hybrid heat rejection system using an air source dry or adiabatic fluid cooler.
5. Water-to-water or water-to-air: chillers, heater/chillers, reversing loop heater/chillers, water source heat pumps, water cooled direct expansion air conditions, VRF and VRV.

FIG. 17

Disclosed is a type of adiabatic fluid cooler that can offer significantly colder fluid cooling using the wet bulb air temperature in low humidity areas to allow cool geothermal loop temperatures that can be transferred to the indoor hydronic HVAC loop to provide sensible-only "free cooling" as well as auxiliary heat rejection for the geothermal loop.

FIG. 18

This embodiment shows typical piping, pumping, electrical and control components and equipment for combining the geothermal loop with a pressure sewer system.

FIG. 19

This embodiment shows the pressure sewer system (single pass) plus geothermal loop system in a typical residential yard.

FIG. 20

This embodiment shows the pressure sewer system (three pass) plus geothermal loop system including an optional in-ground vault(s) for piping, valves and sensors installed in a typical residential yard.

FIG. 21

This figure outlines componentry of a typical in-ground piping, control valve and sensor vault.

FIG. 22

This figure describes a derivation of the pressure sewer plus (geothermal) heat transfer system (as in FIGS. 4 and 5) now arranged as a coaxial, multiple tube, double wall heat exchanger that is not horizontally bored and is not surrounded by earth, but surrounded by an insulating material and encased in a solid, waterproof wrapper. This arrangement can be used to either add heat to or remove heat from a fluid 1522 (e.g., wastewater such as sewage) using either warm or cold heat transfer fluid 1524 and 1526.

Figure 1B:
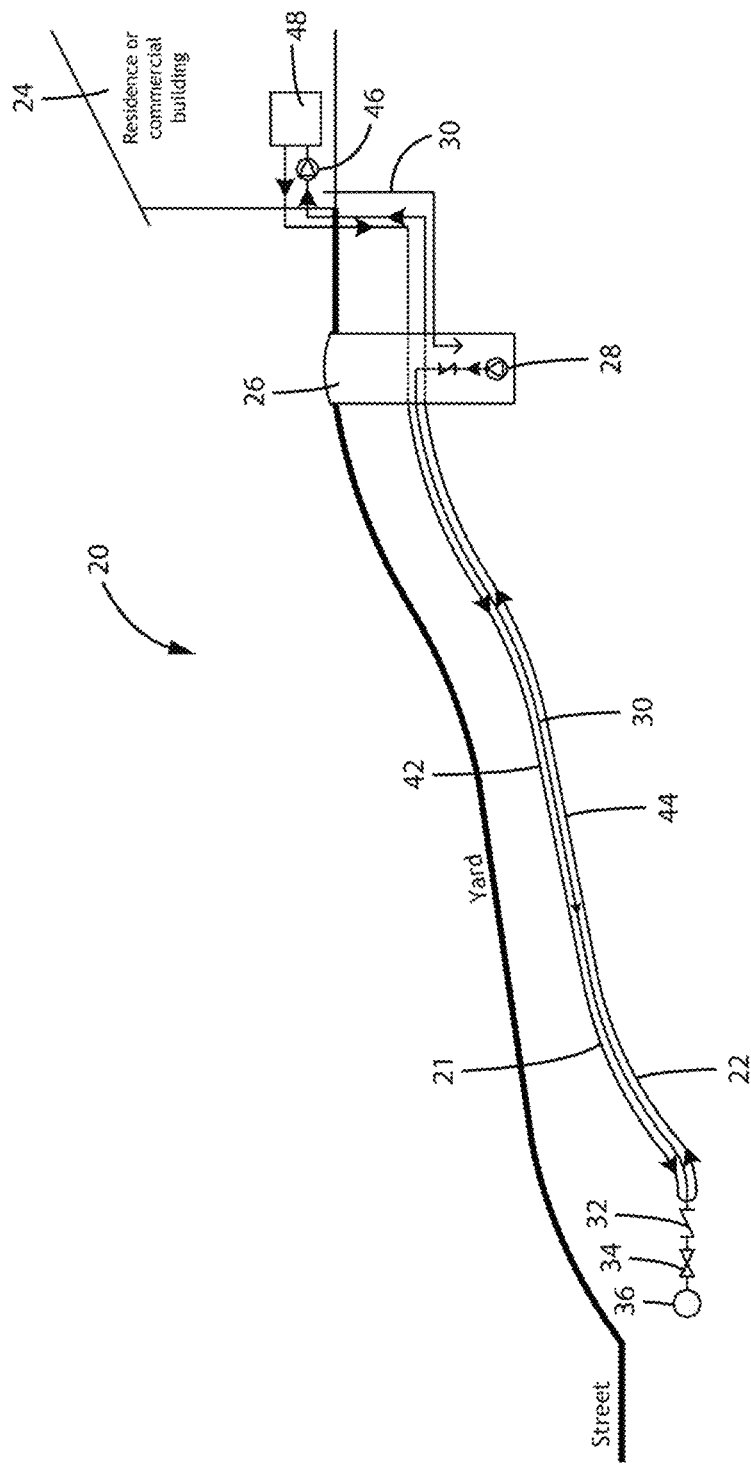
FIG. 1B is a diagrammatic illustration of a combined geothermal loop and integrated wastewater discharge system.

Referring to FIGS. 1A and 1B there is illustrated, in diagrammatic form, a supplemental heat transfer apparatus 20 which is constructed and arranged as the integration of a pressure sewer system 21 for residential wastewater with a geothermal system 22. According to the exemplary embodiments of the present invention, apparatus 20 is the integrated and cooperative combination of a pressure sewer system, such as system 21 for wastewater and a geothermal system, such as system 22. Inventive aspects of apparatus 20 include the use of wastewater outflow from a building (see FIG. 1A) for heat transfer. The specific wastewater network being utilized is part of a pressure sewer system. Apparatus 20 is suitable for use with any building which includes wastewater outflow and a pressure sewer system and requires the integration of a geothermal system or loop. However, for the exemplary embodiments as disclosed herein, this selected building is a residential structure, specifically a house. Further, throughout the following descriptions of the exemplary embodiments it will be shown that the principle behind all of the embodiments is to effect some type of supplemental or additional heat transfer by utilizing other sources which are readily available, without any added cost, other than the cost of system set up and integration. In the first disclosed embodiment that integration involves a pressure sewer system with a line or conduit running from a house to the street where it connects with the main city sewer. The other part of this integration is a geothermal loop with its supply line and return line running in close proximity to the wastewater conduit. While the wastewater conduit is a required system for home construction which is not on a septic tank, the geothermal loops which are described herein would be elective or optional as other heating and cooling systems could be provided for the house. Whether geothermal loops are added in order to take advantage of the described integration or whether the house is already planned for geothermal loops, one of the important aspects of the disclosed embodiments is the ability to run those lines together as part of the horizontal boring technique or method so as to achieve certain cost savings relative to system integration.

FIG. 1A is a diagrammatic illustration of a residential structure (house) (or commercial building) with a pressure sewer system 21. FIG. 1B is a diagrammatic side elevational view of apparatus 20 wherein system 21 is integrated with geothermal system 22. The elements of apparatus 20 and of this integration for house 24 include grinder station 26, grinder pump 28, wastewater conduit 30, check valve 32, curb stop isolation valve 34 and the connection 36 to a municipal sewer. The exemplary embodiment of FIG. 1B illustrates a municipal sewer as the point of connection for the wastewater conduit 30. However, other treatment or wastewater storage options are contemplated for the point of connection 36.

The geothermal system 22 includes a supply conduit 42, a return conduit 44, a pump 46 and a geothermal loop interface 48 within the house 24. The geothermal system 22 is constructed and arranged as a continuous flow loop from interface 48 to the flow loop end point in the earth and then back to interface 48. The heat transfer fluid which is utilized for the geothermal system 22 leaves the house 24 and flows by way of supply conduit 42 through the earth (at the appropriate depth) to the flow loop end point of supply travel before reversing the flow direction and returning to interface 48 by way of return conduit 44. Depending on the relative temperatures of the heat transfer fluid and that of the earth's heat sink, the temperature of the transfer fluid will either be raised or lowered before returning to the house.

There is control logic associated with the geothermal loop interface. This control logic is used to perform one or more of the following functions:

1. As an interface with grinder pump operational control to use grinder pump station basin storage capacity to synchronize grinder pump operation with the geothermal loop operation within the limit of storage capacity of the grinder pump station. In other words, the grinder pump will operate when there is either a need to extract heat from the pressure sewer lateral or reject heat into the pressure sewer lateral. Generally a grinder pump typically runs at the time of greatest water/wastewater use, early morning or early evening, whereas that does not necessarily match up the HVAC loads so the system will have extra storage capacity to match grinder pump run times to the HVAC loads.
2. To monitor proper system pressure and operation of all pumps.
3. To monitor the temperature of the discharge sewage to the municipal collection system and all other heat recovery sources such as potable water, reuse water and rainwater to prevent freeze up in the sewage lateral or the other heat recovery loops not using glycol in winter months.
4. To monitor proper operation of all system sensors and control valves.
5. To measure pump run time and temperature differential to determine BTUs recovered.
6. For logic and control integration with the indoor HVAC equipment system.

The diagrammatic illustration of FIG. 1B shows the wastewater conduit 30 positioned between supply conduit 42 and return conduit 44. By positioning wastewater conduit 30 in close proximity to the supply conduit 42, supplemental heat transfer takes place in conjunction with the geothermal system 22. As one example of the relative temperatures, consider a wastewater (discharge) temperature of 72 degrees, F and consider a heat transfer fluid temperature of at least 82 degrees, F in the warmer months and no more than 62 degrees, F in the colder months. If a 10 degree temperature change can be affected and with approximately 310 gallons of wastewater being pumped per day to the sewer system, approximately 26,000 BTU's of heat transfer to the geothermal system 22 can be realized.

The diagrammatic side elevational view of FIG. 1B shows a single geothermal loop being used in conjunction with and in integration with the use of residential wastewater in order to supplement the heat transfers associated with the geothermal system 22. The wastewater conduit 30 from house 24 is singular with a single point of connection 36 to the corresponding municipal sewer. However, as diagrammatically illustrated in FIG. 2, the geothermal system 22 may include a plurality of individual, geothermal loops 50, 52 and 54. Each geothermal loop 50, 52 and 54 includes a respective supply conduit 50a, 52a and 54a and a respective return conduit 50b, 52b and 54b. The generally parallel flow pattern of these three geothermal loops has a common connection to pump 56 and a common connection to geothermal interface 58. In the exemplary embodiment of FIG. 2, the supplemental heat transfer apparatus 20 provides the integration of system 21 into a cooperating relationship using geothermal loop 52. The cooperative relationship between system 21 and geothermal loop 52 is essentially the same as the cooperative relationship which is diagrammatically illustrated in FIG. 1B for apparatus 20 including system 21 and geothermal system 22. Geothermal interface 58 has a similar purpose, use and function to those of geothermal loop interface 48.

Figure 3:
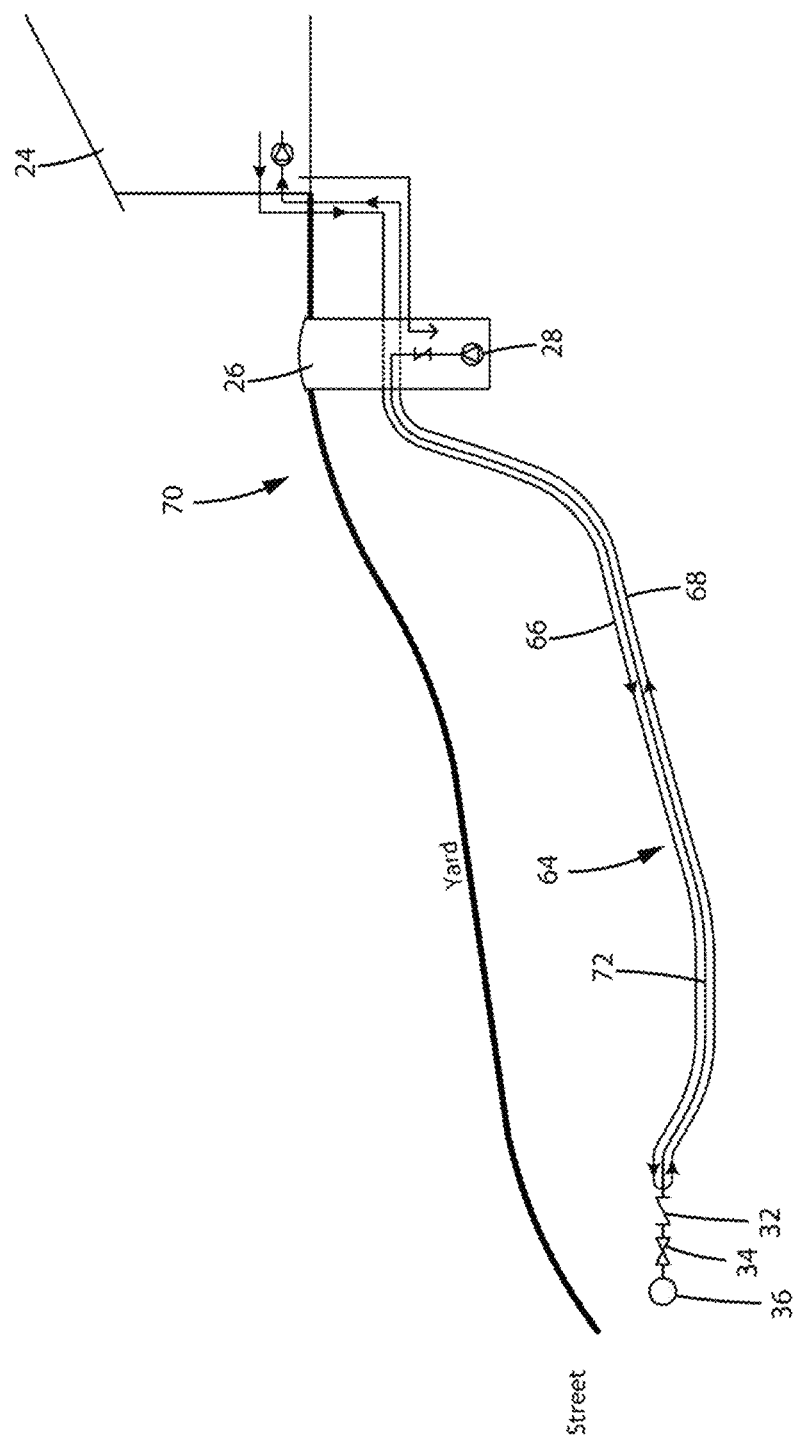
FIG. 3 is diagrammatic illustration of the FIG. 1B combination with the wastewater discharge system and geothermal loop running at a greater depth.

Referring to FIG. 3, a layout variation to what is illustrated in FIG. 1B is disclosed. The FIG. 3 arrangement for geothermal system 64 is essentially the same as geothermal system 22 except for the specific shape, path contours and depth in the earth of the supply conduit 66 and of the return conduit 68. The FIG. 3 illustration is intended to show the positioning of the conduits 66 and 68 at a significantly greater depth in the earth, as compared to the operating depth of geothermal system 22. This greater depth in the earth means that the cooperating supplemental heat transfer apparatus 70 is essentially the same as apparatus 20 except for the specific shape, path contours and depth in the earth of wastewater conduit 72. The other elements of apparatus 70 and of this integration for house 24 include, as with apparatus 20, grinder station 26, pump 28, check valve 32, curb stop isolation valve 34 and connection 36. These elements do not change when the apparatus 20 is positioned at a greater depth in the earth in the form of apparatus 70.

The reference herein to a pressure sewer system is important as this type of sewer system provides a design feature which can be utilized by apparatus 20 (and by apparatus 70). More specifically, this type of sewer system creates a wastewater flow which essentially fills the cross-sectional area of the conduit. In contrast, a gravity sewer system would typically have wastewater only in the lower portion of the conduit, rather than effectively filling the cross-sectional area of the conduit. In order to facilitate heat transfer between the wastewater flow and geothermal fluid, it is preferable to have these flows in close proximity to each other. The technique selected for the disclosed embodiments is to run the wastewater conduit in contact with, or at least in close proximity to, the geothermal loop conduits, both supply and return.

Figure 4:
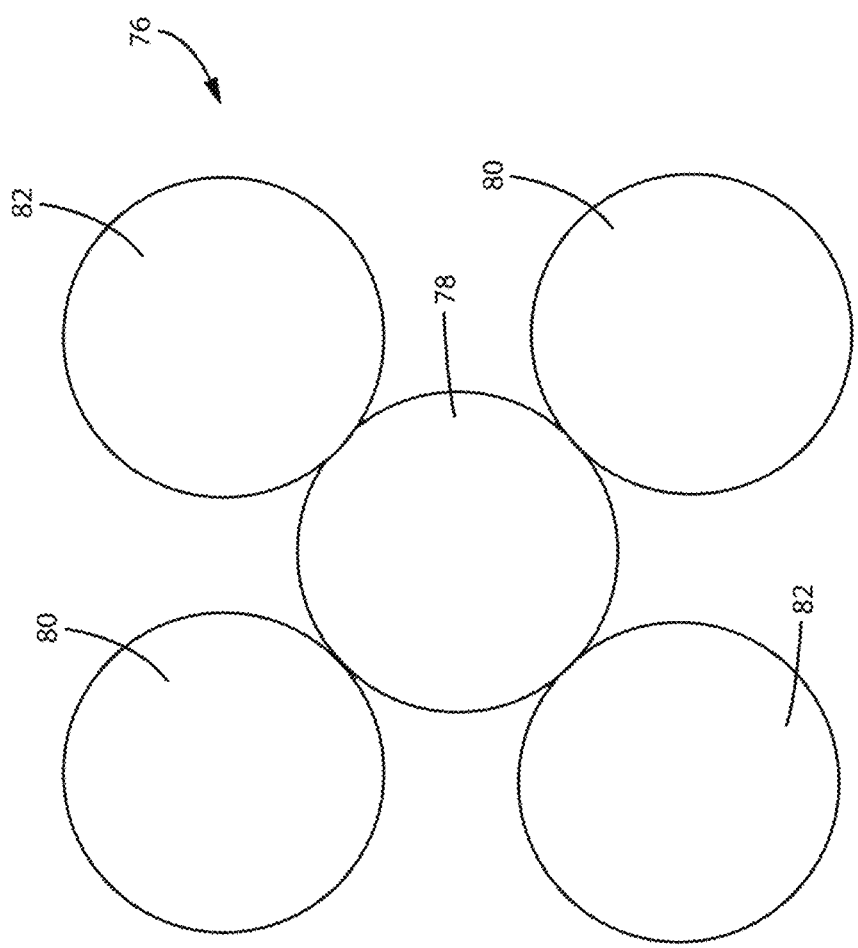
FIG. 4 is a diagrammatic illustration of how multiple piping or conduit lines may be arranged for heat transfer.

One possible arrangement 76 of flow conduits for use as part of the exemplary embodiments is diagrammatically illustrated in FIG. 4. In the FIG. 4 arrangement, wastewater conduit 78 is centered and surrounded by two geothermal loop supply conduits 80 and by two geothermal loop return conduits 82. This pattern is described herein as a "four-corners" pattern due to the placement of conduits 80 and 82 around conduit 78. With a pressure sewer system, as noted above, it is expected that the full cross-sectional area of the wastewater conduit 78 will be filled with wastewater. As such there will be a balanced pattern of heat transfer, regardless of where the geothermal loop conduits are positioned relative to conduit 78. In terms of specifics and with continued reference to FIG. 4, each conduit 78, 80 and 82 is preferably a 1.25 inch diameter pipe.

Figure 5:
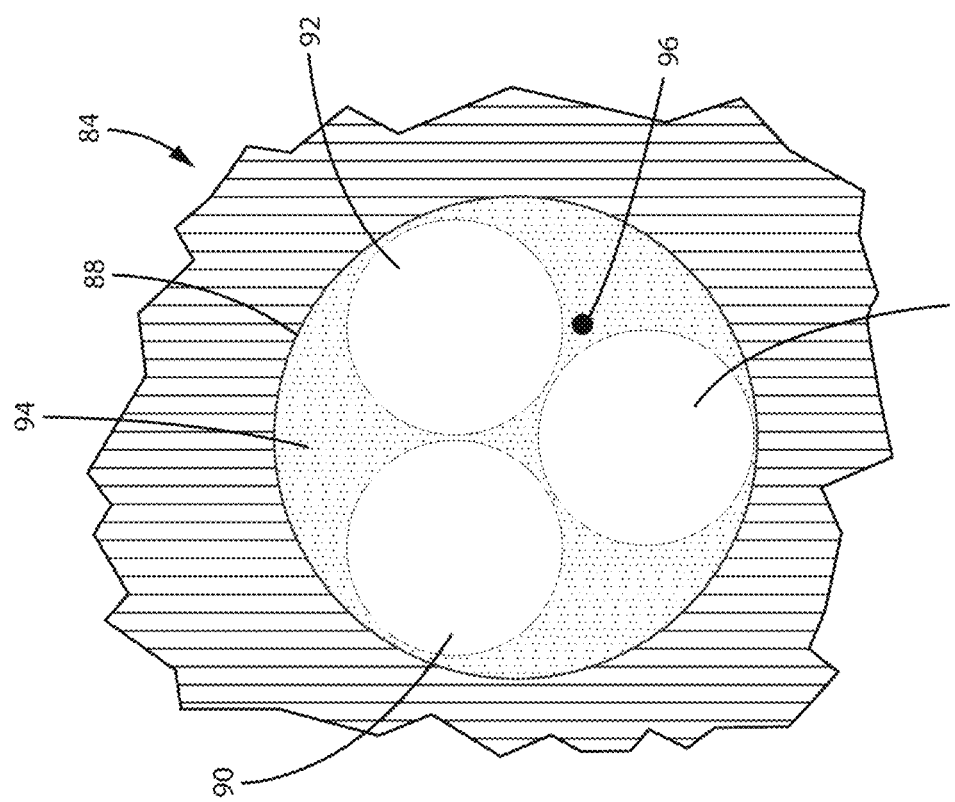
FIG. 5 is a diagrammatic illustration as to how a pressure sewer line and geothermal loop line can be combined for heat transfer.

Referring now to FIG. 5 another possible arrangement 84 of flow conduits for use as part of the exemplary embodiments is diagrammatically illustrated. In the FIG. 5 arrangement wastewater conduit 86 is positioned to one edge of the bore hole 88. The geothermal loop supply conduit 90 is positioned in close proximity to conduit 86. The geothermal loop return conduit 92 is positioned in close proximity to conduit 86. The bore hole 88 may optionally be filled with an enhanced heat transfer grout 94. Also shown in FIG. 5 is a trace wire 96.

Figure 6:
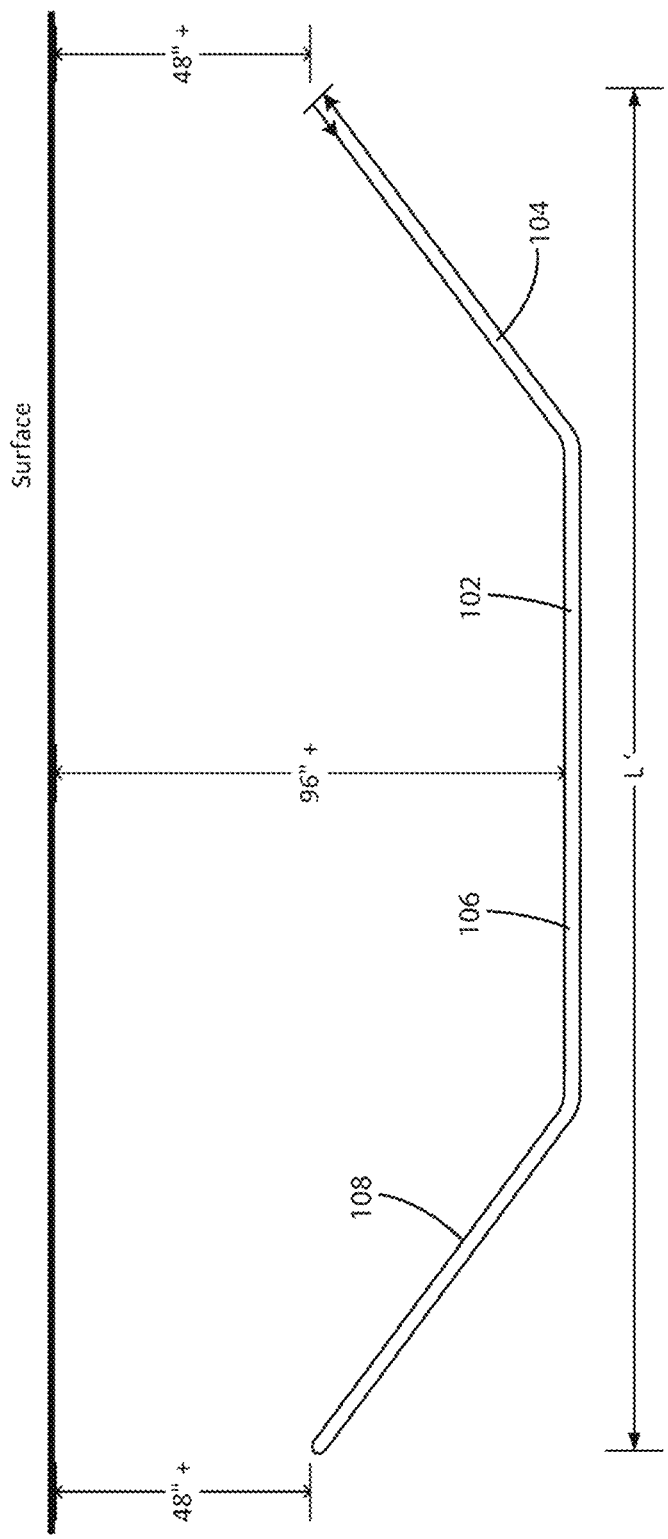
FIG. 6 is a diagrammatic illustration of the use of proximal and distal pits in conjunction with horizontal boring technology.

The conduit arrangements 76 and 84 of FIGS. 4 and 5, respectively, are able to be created as a part of a horizontal boring technique or method which is commonly used for creating the lay-in and routing of the geothermal loop conduits. With reference to FIG. 6, the horizontal boring technique is diagrammatically represented by the position and orientation of the geothermal loop 102. The horizontal boring technique begins with the digging or excavation of a pit which should be at a depth in the earth below the freeze line such as 4 to 6 feet in depth. This initial pit is near the proximal end of the geothermal loop and in the exemplary embodiment is set at a depth of 4 feet. The horizontal boring extends to the desired distal end point of the loop 102 or of the loop segment, at which point another pit, of at least 4 feet in depth, is dug or excavated. In the FIG. 6 illustrated arrangement for geothermal loop 102, a lead-in section 104 extends from the first (proximal) pit to a depth of at least 8 feet. A horizontal section 106 runs from the lead-in section 104 to the exit section 108.

The horizontal boring technique or method includes the step of actually pulling the geothermal loop conduits through the bored hole. This step is normally performed at the time of new construction, but can be performed after construction of the house. If at the time of new construction, then at the same time the geothermal loop conduits are being pulled, the pressure sewer/wastewater conduit can be pulled, or vice versa, enabling all conduits to be pulled as a group or bundle of conduits or lines at one time. As noted above, whether the wastewater conduits are being pulled or the geothermal loop conduits are being pulled and regardless of which one is primary and which one is secondary, the exemplary embodiments contemplate that all of these conduits or conduit lines (piping) will be pulled together as a bundle for the corresponding cost savings.

Figure 7:
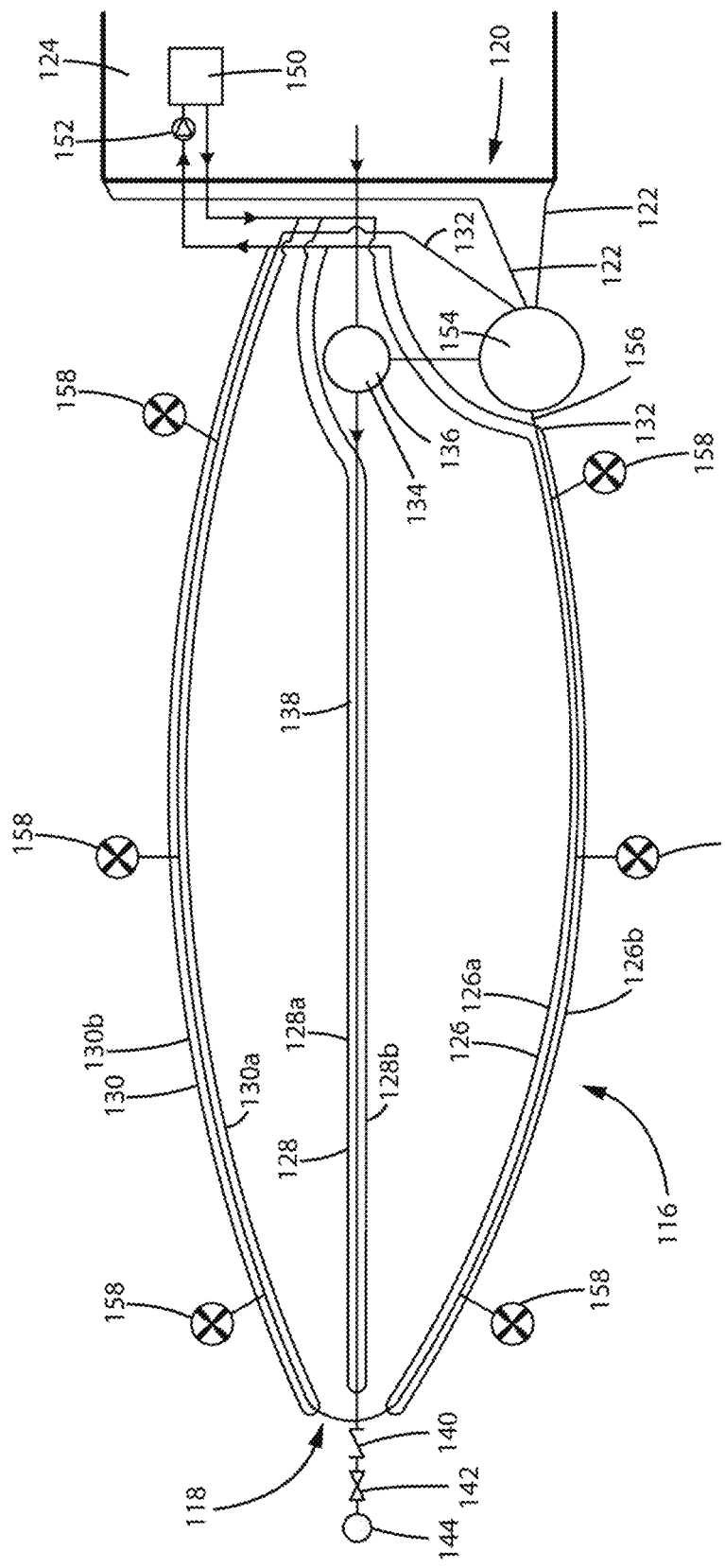
FIG. 7 is a diagrammatic illustration of the integration of a wastewater discharge system and geothermal loops with the addition of rainwater capture.

With reference to FIG. 7 another embodiment of the geothermal loop system 116 which is integrated with the pressure sewer system 118 is illustrated. In addition to this integration of geothermal loop system 116 and sewer system 118, there is the added integration of the rainwater system 120 which is constructed and arranged to capture rainwater from the roof of the house, including capture of rainwater from the downspouts. These two capture points or locations are diagrammatically illustrated in FIG. 7 by conduit lines 122 extending from house 124.

Figure 2:
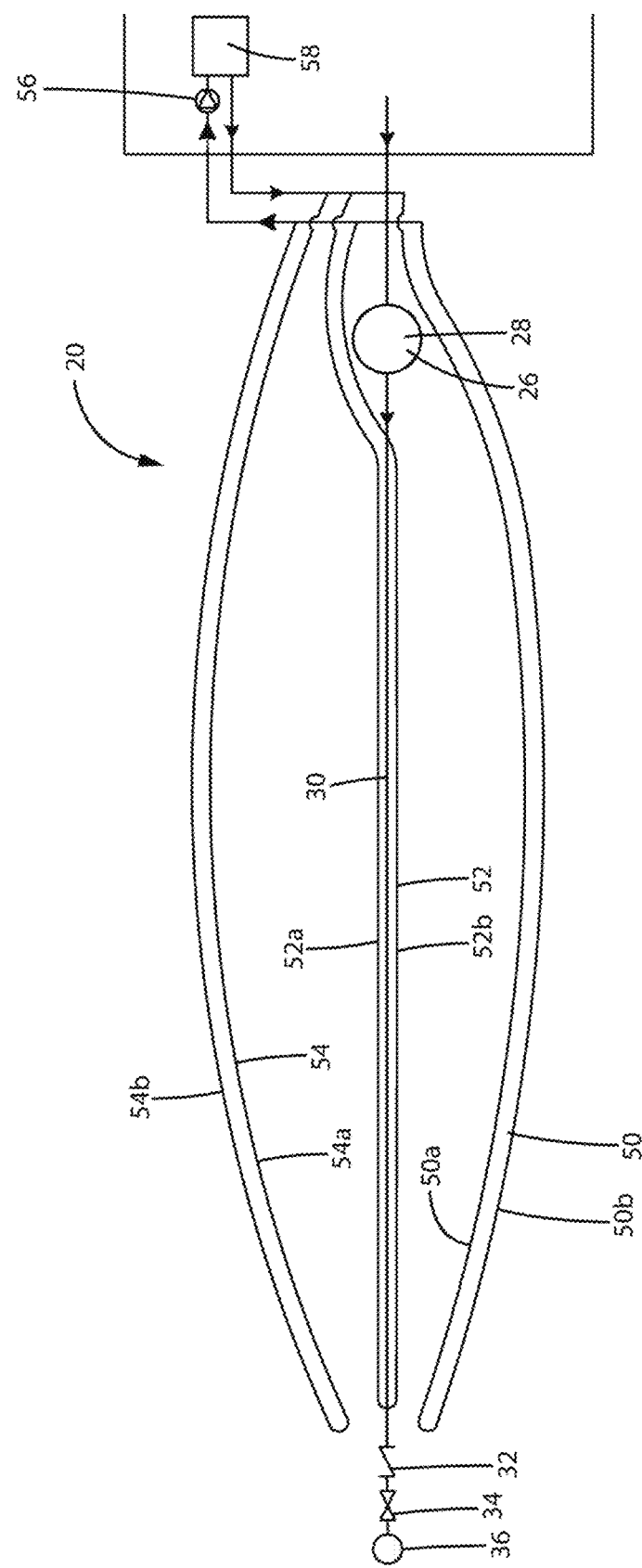
FIG. 2 is a plan view of the FIG. 1B combination showing two additional geothermal loops.

With continued reference to the diagrammatic illustration of FIG. 7, the geothermal loop system 116 includes three geothermal loops 126, 128 and 130. The pressure sewer system 118 is integrated with geothermal loop 128 in a manner which may be similar to or essentially the same as what is illustrated in FIGS. 1B and 2. The rainwater system 120 includes rainwater lines or conduits 132 which are integrated with geothermal loops 126 and 130. It is to be understood that additional geothermal loops could be provided as a part of the geothermal loop system 116. Further, the pressure sewer system 118 can be integrated with any geothermal loop. Similarly, the rainwater lines 132 of rainwater system 120 can be integrated with any geothermal loop. The pressure sewer system 118 includes a grinder station 134, a grinder pump 136, lateral discharge pipe 138, a check valve 140, a curb stop isolation valve 142 and a connection 144 to a municipal sewer line or to other treatment or wastewater storage. Each geothermal loop includes a corresponding supply conduit 126a, 128a and 130a, respectively, and a corresponding return conduit 126b, 128b and 130b, respectively. Each geothermal loop 126, 128 and 130 has a common supply conduit connection to the HVAC interface 150 and a common return conduit connection to pump 152.

The rainwater conduit lines 122 from the roof and downspouts of the house 124 feed rainwater into capture tank 154. Capture tank 154 may be an in-ground capture tank or an above ground capture tank. The capture tank 154 is connected to irrigation conduits 156, one irrigation conduit 156 being integrated with geothermal loop 126 and another integration conduit 156 being integrated with geothermal loop 130. A plurality of sprinkler heads 158 (or other non-potable outlets) are connected to and function as a part of each geothermal loop 126 and 130. In addition to rainwater recover, other supplementary heat sources are contemplated. The other sources may include potable water, reuse water and sump pump discharge water.

Figure 8:
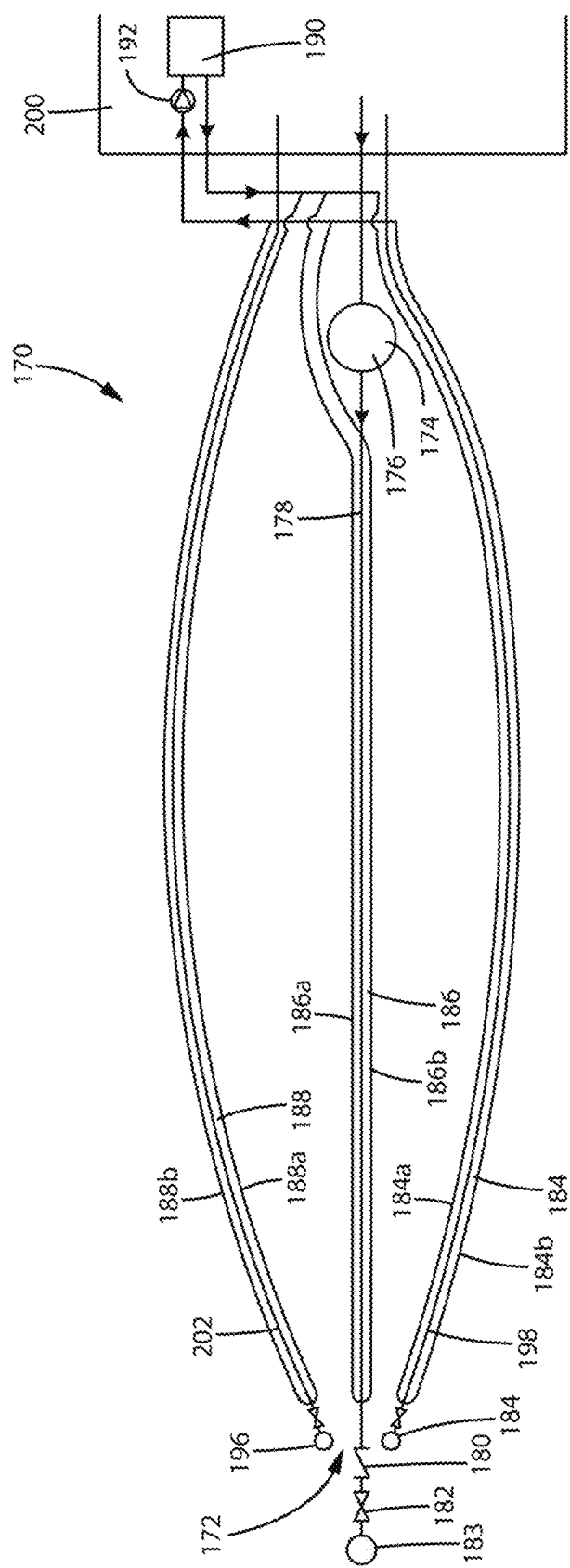
FIG. 8 is a diagrammatic illustration of the combination of a wastewater discharge system integrated with geothermal loops and with the added use of city water and/or reuse water for thermal boost.

With reference to FIG. 8 another exemplary embodiment of a geothermal loop system 170 which is integrated with a pressure sewer system 172 is illustrated. The structural elements of this integrated combination include a grinder station 174, a grinder pump 176, lateral discharge piping 178, a check valve 180, a curb stop isolation valve 182 and a connection 183 to a municipal sewer line or to other treatment or wastewater storage.

Geothermal loop system 170 includes three geothermal loops 184, 186 and 188. Each geothermal loop includes a corresponding supply conduit 184a, 186a and 188a, respectively, and a corresponding return conduit 184b, 186b and 188b, respectively. Each geothermal loop 184, 186 and 188 has a common supply conduit connection to HVAC interface 190, and a common return conduit connection to pump 192. Geothermal loops 184 and 188 may be arranged with a supply 194 of city water (or well water) and/or a supply 196 of reuse water from a municipality. In the FIG. 8 exemplary embodiment, supply 194 is connected by way of conduit 198 or similar piping to house 200. Supply 196 is connected by way of conduit 202 or similar piping to one or more irrigation and/or non-potable use locations.

Figure 9:
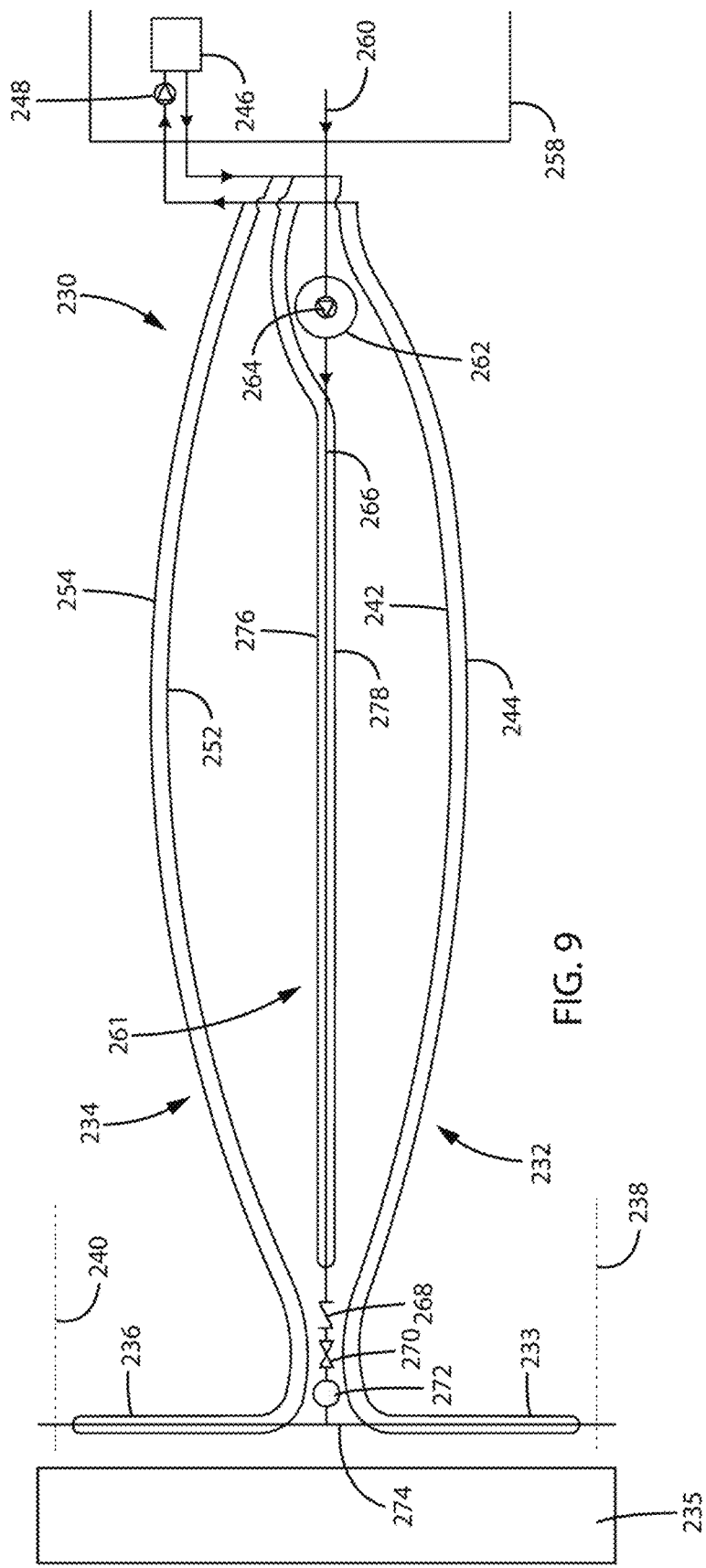
FIG. 9 is a diagrammatic illustration of another exemplary embodiment of a supplemental heat transfer apparatus according to the present invention.

Referring to FIG. 9 there is diagrammatically illustrated another exemplary embodiment of a supplemental heat transfer apparatus 230 according to the present invention. Geothermal loop 232 extends in close proximity to a downstream length of the main (or branch) pressure sewer piping 233 along the street 235. Geothermal loop 234 extends in close proximity to an upstream length of the main (or branch) pressure sewer piping 236. The lot lines 238, 240 for the structure (residence) are noted.

Geothermal loop 232 includes a supply line or conduit 242 and a return line or conduit 244. Their distal junction is part of piping 233. Their proximal connections are, respectively, out of and into HVAC interface 246. Loop pump 248 is located at the incoming connection of conduit 244. Geothermal loop 234 has a similar construction to what has been described for geothermal loop 232.

Geothermal loop 234 includes a supply line or conduit 252 and a return line or conduit 254. Their distal junction is part of piping 236. Their proximal connections are, respectively, out of and into HVAC interface 246.

The wastewater outflow from the structure 258 is represented by conduit 260 and is associated with geothermal loop 261. Conduit 260 connects to a grinder station 262 which includes a grinder pump 264. The lateral discharge pipe 266 extends to check valve 268. Downstream from check valve 268 is a curb stop isolation valve 270 and then the connection 272 to the municipal sewer collection piping system 274. The lateral discharge pipe 266 includes in close proximity, a geothermal loop supply conduit 276 and a geothermal loop return conduit 278. The proximal connections of conduits 276 and 278 are, respectively, out of and into HVAC interface 246.

The illustrated and described embodiment of apparatus 230 includes as an important structural part of the described geothermal loop 261 a wastewater discharge conduit 260 running from the corresponding building, residence or similar structure. Wastewater discharge conduit 260 constitutes a pressure sewer line which is a part of a pressure sewer system and is pumped to the existing municipal sewer line or system. As described herein, a pressure sewer system creates a wastewater flow which essentially fills the cross-sectional area of the conduit, such as conduit 260.

With the conduit filled with wastewater due to the "pressure" pumping, there is direct contact by the wastewater with essentially the entirety of the inner surface of the conduit. This contact assures efficient heat transfer from the exterior surface of the conduit for use as a part of the described geothermal loop 261 This higher level of heat transfer due to having a filled conduit as compared to that of a gravity system, is important to the efficiency and effectiveness of the geothermal loop 261 in being able to achieve energy efficiencies and savings.

Figure 10:
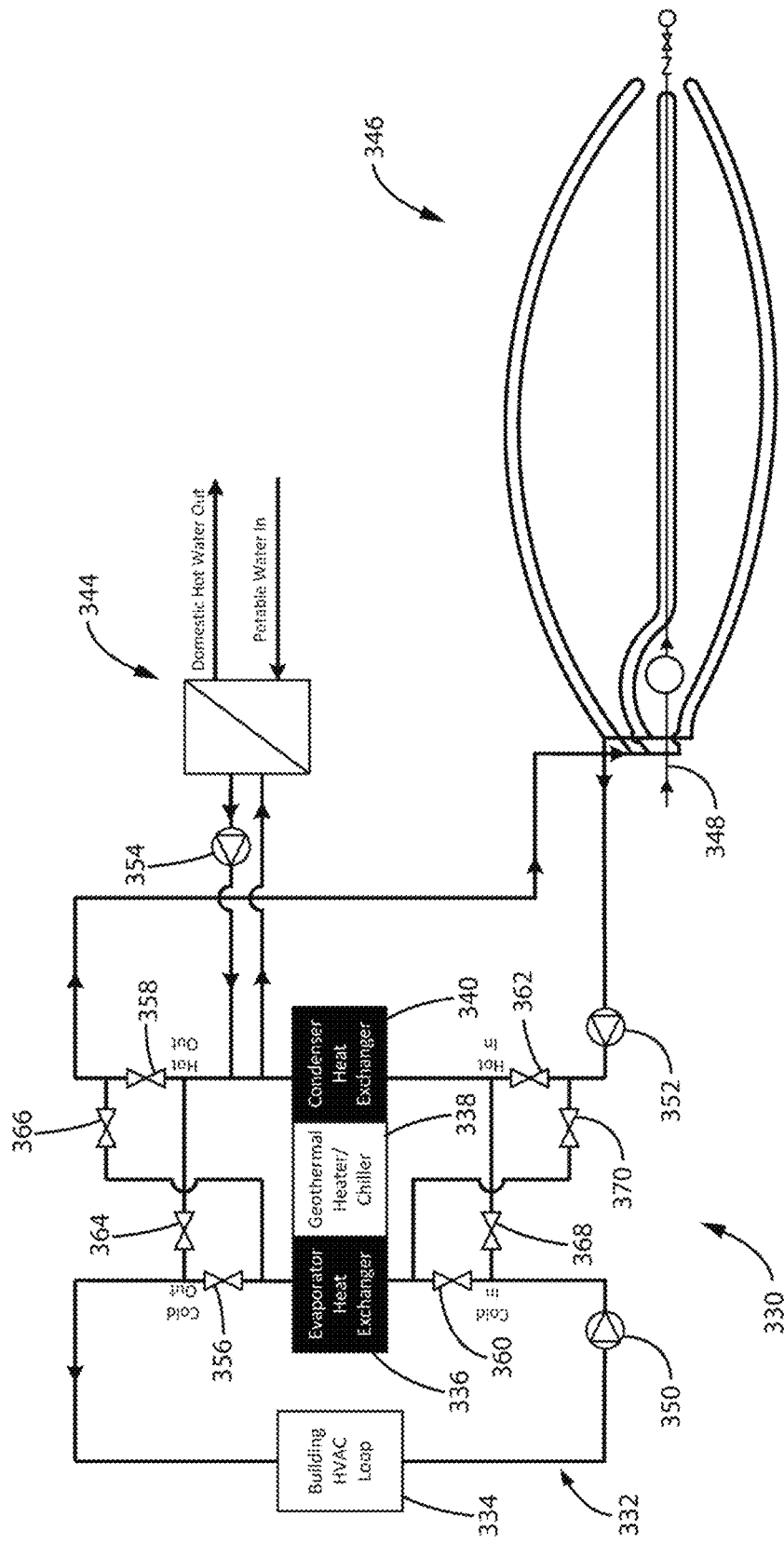
FIG. 10 is a diagrammatic illustration of another exemplary embodiment of a supplemental heat transfer apparatus according to the present invention.
Figure 11:
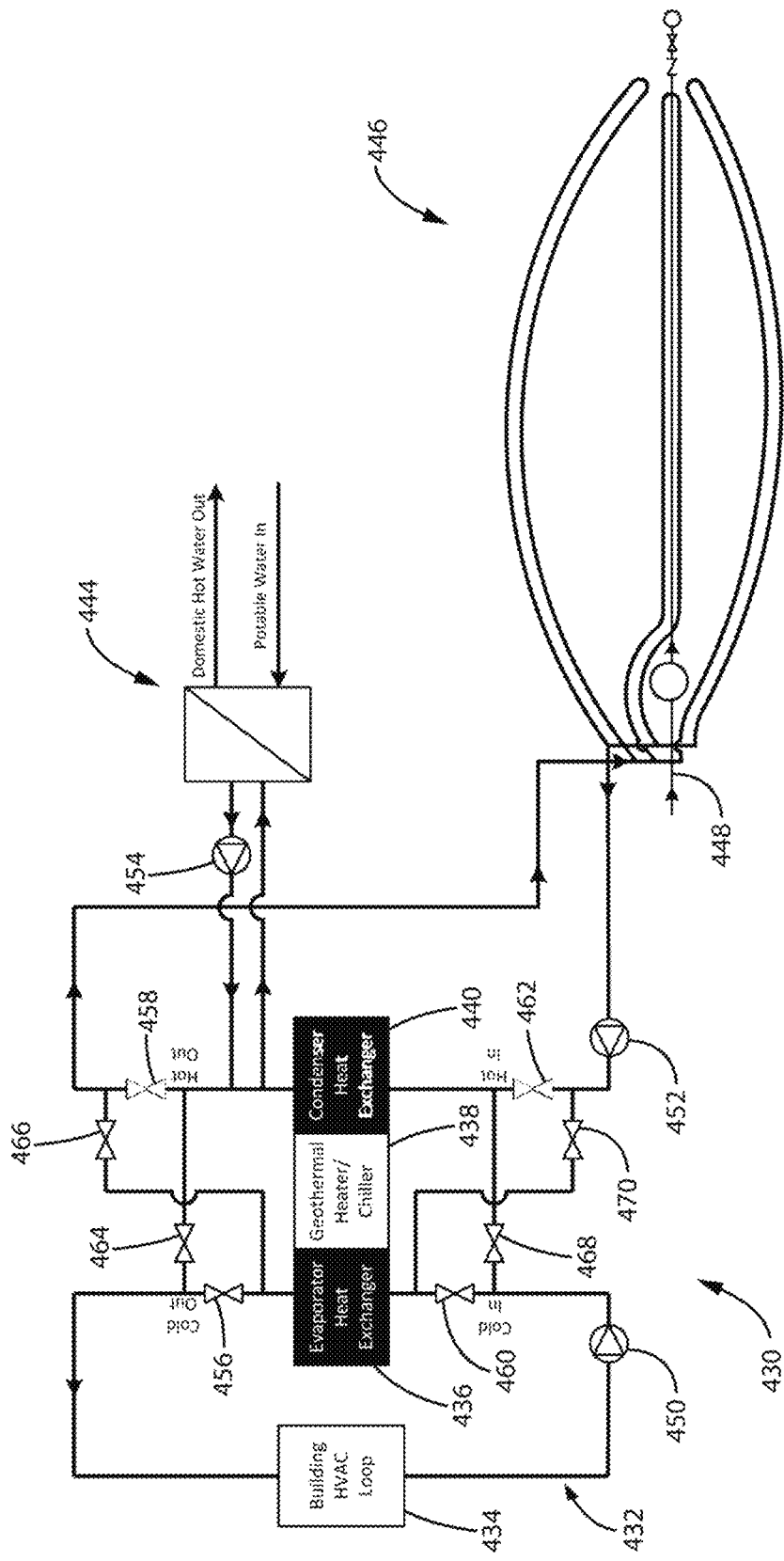
FIG. 11 is a diagrammatic illustration of another exemplary embodiment of a supplemental heat transfer apparatus according to the present invention.

Referring to FIG. 10 there is diagrammatically illustrated another exemplary embodiment of a supplemental heat transfer apparatus 330 according to the present invention. Apparatus 330 is best described as a geothermal heater/chiller with domestic hot water recovery—HVAC cool mode. FIG. 11 illustrates apparatus 330 in an HVAC heating mode and due to the change in state of the various valves, reference number 430 is used for this arrangement of apparatus 330. The common elements found in FIG. 11 based on FIG. 10 have similar reference numbers, increased by 100 (300 series and 400 series).

Apparatus 330 includes a network 332 of conduit lines, pumps and control valves. Also included as a part of apparatus 330 is a building HVAC loop 334, evaporator heat exchanger 336, geothermal heater/chiller (compressor based heater/chiller) 338 and condenser heat exchanger 340.

Network 332 is in flow communication with plate heat exchanger 344 and with geothermal loop 346, both of which are part of apparatus 330. Plate heat exchanger 344 is used to preheat domestic hot water. Geothermal loop 346 is used for heat rejection. Conduit 348 is used for wastewater discharge from the corresponding building, residence or structure. Pump 350 is used for HVAC supply in the building. Pump 352 is positioned between geothermal loop 346 and the remainder of network 332. Pump 354 is positioned between plate heat exchanger 344 and the remainder of network 332. The following table denotes the status of each control valve in the illustrated HVAC "Cooling Mode".

TABLE I

| Valve | Status |
|---|---|
| 356 | Open |
| 358 | Open |
| 360 | Open |
| 362 | Open |
| 364 | Closed |
| 366 | Closed |
| 368 | Closed |
| 370 | Closed |

The illustrated and described embodiment of apparatus 330 includes as an important structural part of the described geothermal loop 346 a wastewater discharge conduit 348 running from the corresponding building, residence or similar structure. Wastewater discharge conduit 348 constitutes a pressure sewer line which is a part of a pressure sewer system and is pumped to the existing municipal sewer line or system. As described herein, a pressure sewer system creates a wastewater flow which essentially fills the cross-sectional area of the conduit, such as conduit 348.

With the conduit filled with wastewater due to the "pressure" pumping, there is direct contact by the wastewater with essentially the entirety of the inner surface of the conduit. This contact assures efficient heat transfer from the exterior surface of the conduit for use as a part of the described geothermal loop 346. This higher level of heat transfer due to having a filled conduit as compared to that of a gravity system, is important to the efficiency and effectiveness of the geothermal loop 346 in being able to achieve energy efficiencies and savings.

The FIG. 10 apparatus is set up to operate in the summertime HVAC cooling mode. The apparata of FIGS. 10-15 include heat recovery off the condenser for domestic hot water preheat. Building lot sizes may not have enough practical area to install a geothermal loop system with enough capacity to handle 100% of the summer cooling requirement and/or 100% of the heating requirement, Therefore, the apparata of FIGS. 10-13D envision use of a water-to-water heater/chiller that would have control valves that could reverse the hydronic HVAC loop heating and cooling in the residence with separate hydronic geothermal loop in the yard including the grinder pump heat recovery system. In essence, during the winter months, the heater/chiller evaporator would be in series with the geothermal loop to absorb heat from the ground. This would then be transferred via the heater/chiller compressor to the condenser section which water would circulate to the indoor HVAC heating system.

Referring to FIG. 11 there is diagrammatically illustrated another exemplary embodiment of a supplemental heat transfer apparatus 430 according to the present invention. Apparatus 430 is similar to apparatus 330 except for the state of the eight control valves. Apparatus 330 is configured for the HVAC cooling mode while apparatus 430 is configured for the HVAC heating mode. Considering the structural and layout similarities of apparatus 330 and apparatus 430, similar reference numbers have been used for like components, simply increasing the FIG. 10 reference numbers by 100.

The following table provides the status or condition of each control valve, and this change in status from that provided for apparatus 330 is the only structural difference between apparatus 330 and apparatus 430.

TABLE II

| Valve | Status |
| --- | --- |
| 456 | Closed |
| 458 | Closed |
| 460 | Closed |
| 462 | Closed |
| 464 | Open |
| 466 | Open |
| 468 | Open |
| 470 | Open |

The remaining components and structural elements of apparatus 430, similar to what has been described for apparatus 330 are listed as the following:

| Reference No. | Structural Element |
| --- | --- |
| 432 | Network |
| 434 | Building HVAC loop |
| 436 | Evaporator heat exchanger |
| 438 | Geothermal heater/chiller |
| 440 | Condenser heat exchanger |
| 444 | Plate heat exchanger |
| 446 | Geothermal loop |
| 448 | Discharge conduit |
| 450 | Pump |
| 452 | Pump |
| 454 | Pump |

The illustrated and described embodiment of apparatus 430 includes as an important structural part of the described geothermal loop 446 a wastewater discharge conduit 448 running from the corresponding building, residence or similar structure. Wastewater discharge conduit 448 constitutes a pressure sewer line which is a part of a pressure sewer system and is pumped to the existing municipal sewer line or system. As described herein, a pressure sewer system creates a wastewater flow which essentially fills the cross-sectional area of the conduit, such as conduit 448.

With the conduit filled with wastewater due to the "pressure" pumping, there is direct contact by the wastewater with essentially the entirety of the inner surface of the conduit. This contact assures efficient heat transfer from the exterior surface of the conduit for use as a part of the described geothermal loop 446. This higher level of heat transfer due to having a filled conduit as compared to that of a gravity system, is important to the efficiency and effectiveness of the geothermal loop 446 in being able to achieve energy efficiencies and savings.

With continued reference to the FIG. 11 apparatus, during the summer months control valves would reposition and the loop would be reversed with the evaporator pumping to the indoor HVAC system hydronic loop to remove heat from the building providing a cool environment. The condenser would then be piped in series with the geothermal loop to reject heat into the ground. The heater/chiller system can operate with much higher condensing temperatures in the summer than a water source heat pump that reverses the refrigerant cycle and has a more limited operational temperature range. Generally water source heat pumps need circulating loop temperatures between 60° F. and 90° F. Whereas a reversing loop heater/chiller can operate between 30° F. and 120° F.; therefore, much lower winter temperatures can be used for heating and much higher summer operating conditions can be used for cooling; therefore, extending the performance of a reduced capacity geothermal loop.

Figure 12:
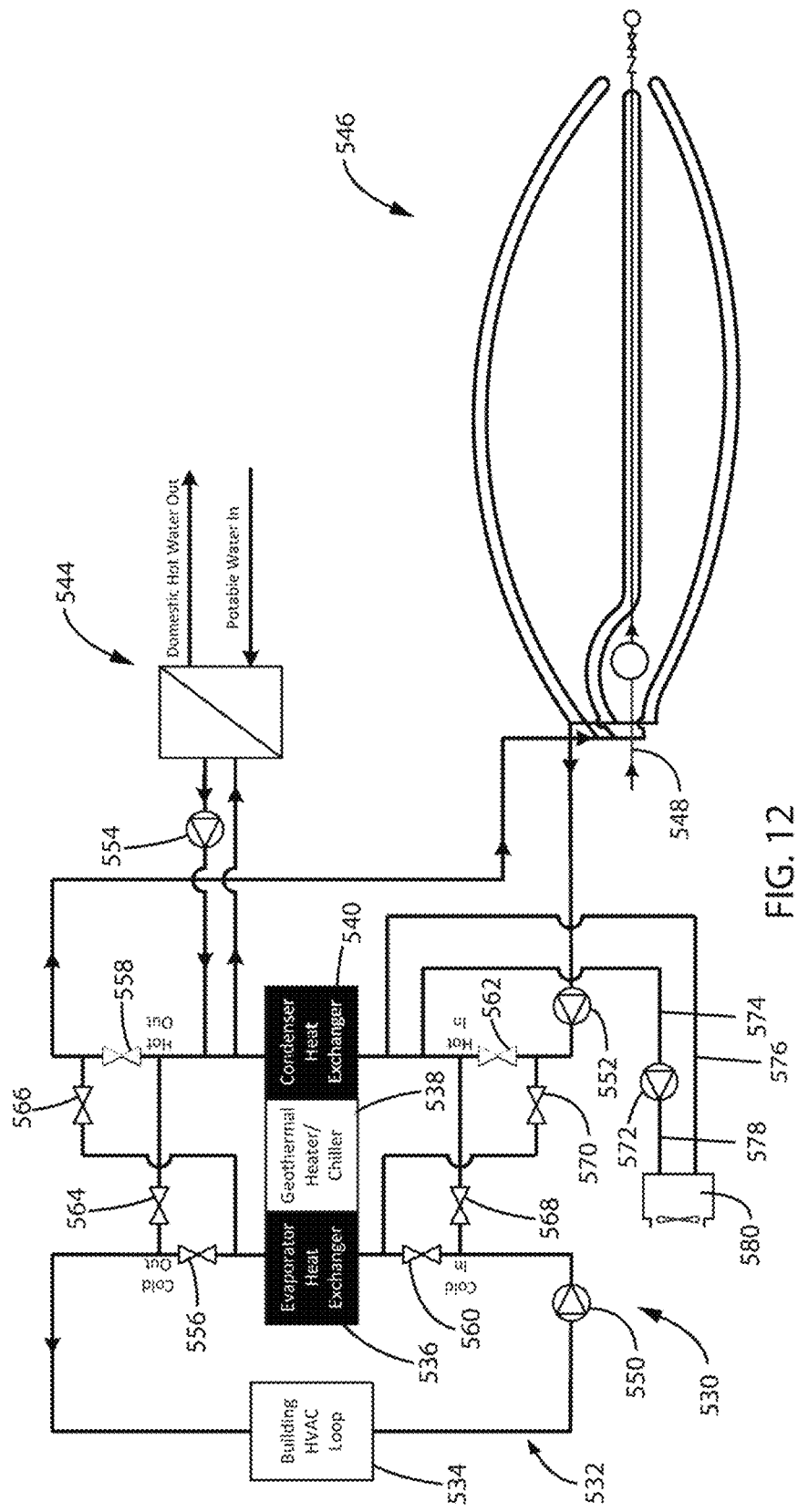
FIG. 12 is a diagrammatic illustration of another exemplary embodiment of a supplemental heat transfer apparatus according to the present invention.

Referring to FIG. 12 there is diagrammatically illustrated another exemplary embodiment of a supplemental heat transfer apparatus 530 according to the present invention. Apparatus 530 is similar in most of its construction to apparatus 330 (HVAC cooling mode) and to apparatus 430 (HVAC heating mode). In terms of the common structural elements and the selected reference numbers, the FIG. 11 400 series numbers have each been increased by 100 for creating corresponding 500 series numbers which are used for the same structural elements and like components.

Apparatus 530 is directed to having additional structure to what is illustrated in FIG. 10 in order to have auxiliary heat rejection. As such, the control valve status of apparatus 530 corresponds to the status of Table I as provided for apparatus 330. In terms of the structure which is been added, there is an auxiliary heat rejection pump 572 and conduit flow lines 574, 576 and 578 all of which are connected with network 532, as illustrated in FIG. 12. An adiabatic or dry auxiliary air source heat rejector (fluid cooler) 580 is connected to pump 572 by conduit flow line 578 and to the network 532 by conduit flow line 576.

Table III provides a listing of the remaining components and structural elements of apparatus 530, similar to what is been described for apparatus 330 and for apparatus 430.

TABLE III

| Reference No. | Structural Element |
|---|---|
| 532 | Network |
| 534 | Building HVAC loop |
| 536 | Evaporator heat exchanger |
| 538 | Geothermal heater/chiller |
| 540 | Condenser heat exchanger |
| 544 | Plate heat exchanger |
| 546 | Geothermal loop |
| 548 | Discharge conduit |
| 550 | Pump |
| 552 | Pump |
| 554 | Pump |

As would be understood, a horizontally bored geothermal loop is limited by the lot size. Accordingly, in addition to having an option for a heater/chiller with an extended loop temperature range of operation, the disclosed structure has added auxiliary heat rejection and heat addition components. FIG. 12 shows the loop as operational as in FIG. 10; however, apparatus 530 adds a supplemental heat rejection in the form of a dry or adiabatic auxiliary air source heat rejecter (fluid cooler).

Referring to FIG. 13A there is diagrammatically illustrated another exemplary embodiment of a supplemental heat transfer apparatus 630 according to the present invention. Apparatus 630 is best described as a geothermal heater/chiller with domestic hot water heat recovery—HVAC heating mode with auxiliary heating. FIG. 13A represents one exemplary embodiment for this described apparatus and capability.

Apparatus 630 includes a network 632 of conduit lines, pumps and control valves. Also included as a part of apparatus 630 is a building HVAC loop 634, evaporator heat exchanger 636, geothermal heater/chiller (compressor based heater/chiller) 638 and condenser heat exchanger 640.

Network 632 is in flow communication with dual coil indirect domestic hot water heater 644 and with geothermal loop 646 both of which are part of apparatus 630. Water heater 644 is used to preheat domestic hot water. Geothermal loop 646 is used for heat rejection. Conduit 648 is used for wastewater discharge from the corresponding building, residence or structure. Pump 650 is used for HVAC supply in the building. Pump 652 is positioned between the geothermal loop 646 and the remainder of network 632. Pump 654 is positioned between water heater 644 and the remainder of network 632. Pump 656 is the solar thermal pump. Pump 658 is the boiler primary pump. Included as a part of apparatus 630 are optional solar panels 660. Also included as a part of apparatus 630 is an optional auxiliary boiler 662 for backup HVAC and domestic hot water heating. Valve 673 is a 2-way, variable valve depending on the temperature to an HVAC heating system. Valve 679 is a 3-way valve. The following table (Table IV) denotes the status of other control valves in the FIG. 13A illustration of apparatus 630.

TABLE IV

| Valve | Status |
|---|---|
| 664 | Closed |
| 666 | Closed |
| 668 | Closed |
| 670 | Closed |
| 672 | Open |
| 674 | Open |
| 676 | Open |
| 678 | Open |

The illustrated and described embodiment of apparatus 630 includes as an important structural part of the described geothermal loop 646 a wastewater discharge conduit 648 running from the corresponding building, residence or similar structure. Wastewater discharge conduit 648 constitutes a pressure sewer line which is a part of a pressure sewer system and is pumped to the existing municipal sewer line or system. As described herein, a pressure sewer system creates a wastewater flow which essentially fills the cross-sectional area of the conduit, such as conduit 648.

With the conduit filled with wastewater due to the "pressure" pumping, there is direct contact by the wastewater with essentially the entirety of the inner surface of the conduit. This contact assures efficient heat transfer from the exterior surface of the conduit for use as a part of the described geothermal loop 646. This higher level of heat transfer due to having a filled conduit as compared to that of a gravity system, is important to the efficiency and effectiveness of the geothermal loop 646 in being able to achieve energy efficiencies and savings. Included as a part of apparatus 630 is a potable water in line 675 and a 2-way valve 677 which is varied depending on the temperature to evaporator heat exchanger 636.

FIG. 13A shows the auxiliary equipment for wintertime operation that would add heat to the loop in the form of a boiler and possible optional solar thermal heat collection system. Obviously the system would include both the auxiliary heating equipment and the auxiliary cooling equipment described in FIG. 13B. These drawing figures show all the components for the auxiliary heating and cooling equipment. Solar panels (or CHP) could, in addition to adding heat as a preheat for the heater/chiller condenser heating system, also be separately piped to the geo loop so during the day excess solar (or CHP) heat can recharge the loop. FIG. 13C illustrates a modification that could be made to the FIG. 13B network. FIG. 13D illustrates a further modification that could be made to the FIG. 13B network.

Referring to FIG. 13B there is diagrammatically illustrated another exemplary embodiment of a supplemental heat transfer apparatus 680 according to the present invention. Apparatus 680 is best described as a geothermal heater/chiller with domestic hot water heat recovery—HVAC cooling mode with auxiliary heating. FIG. 13B represents another exemplary embodiment for this described apparatus and capability.

Apparatus 680 includes a majority of the same structural components, elements and connections which are illustrated in FIG. 13A for apparatus 630. For these same structural components, elements and connections the same reference numbers are used. Apparatus 680 includes network 632 of conduit lines, pumps and control valves. Also included is a part of apparatus 680 is the building HVAC loop 634, evaporator heat exchanger 636, geothermal heater/chiller (compressor based heater/chiller) 638 and condenser heat exchanger 640. Apparatus 680 includes an auxiliary heat rejection pump 682 and a dry or adiabatic auxiliary air source heat rejection as component 684.

Geothermal loop 646 is used for heat rejection. Conduit 648 is used for wastewater discharge from the corresponding building, residence or structure. Pump 650 is used for HVAC supply in the building. Pump 652 is positioned between the geothermal loop 646 and the remainder of network 632. Pump 654 is positioned between water heater 644 and the remainder of network 632. Pump 656 is the solar thermal pump. Pump 658 is the boiler primary pump. Included as a part of apparatus 680 are optional solar panels 660. Also included as a part of apparatus 680 is an optional auxiliary boiler 662 for backup HVAC and domestic hot water heating. The following table (Table V) denotes the status of selected control valves in the FIG. 13B illustration of apparatus 680.

TABLE V

| Valve | Status |
|---|---|
| 664 | Open |
| 666 | Open |
| 668 | Open |
| 670 | Open |
| 672 | Closed |
| 674 | Closed |
| 676 | Closed |
| 677 | 2-way Closed |
| 678 | Closed |
| 679 | 3-way |

The illustrated and described embodiment of apparatus 680 includes as an important structural part of the described geothermal loop 646 a wastewater discharge conduit 648 running from the corresponding building, residence or similar structure. Wastewater discharge conduit 648 constitutes a pressure sewer line which is a part of a pressure sewer system and is pumped to the existing municipal sewer line or system. As described herein, a pressure sewer system creates a wastewater flow which essentially fills the cross-sectional area of the conduit, such as conduit 648.

With the conduit filled with wastewater due to the "pressure" pumping, there is direct contact by the wastewater with essentially the entirety of the inner surface of the conduit. This contact assures efficient heat transfer from the exterior surface of the conduit for use as a part of the described geothermal loop 646. This higher level of heat transfer due to having a filled conduit as compared to that of a gravity system, is important to the efficiency and effectiveness of the geothermal loop 646 in being able to achieve energy efficiencies and savings.

Referring to FIG. 13C there is diagrammatically illustrated another exemplary embodiment of a supplemental heat transfer apparatus 690 according to the present invention. A comparison between apparatus 680 and apparatus 690 will show structures, connections, networks, etc. which are virtually identical, with the exception of the added flowlines 691 and 692 and the addition of control valve 693 which is a three-way valve. Apparatus 690 is described as a geothermal heater/chiller with domestic hot water heat recovery—HVAC heating mode with auxiliary heating.

Referring to FIG. 13D there is diagrammatically illustrated another to exemplary embodiment of a supplemental heat transfer apparatus 695 according to the present invention. Apparatus 695 is virtually identical to the construction and arrangement of apparatus 690 with the exception of the added flowlines 696 and 697 and the addition of control valve 698 which is a three-way valve. Apparatus 695 is described as a geothermal heater/chiller with domestic hot water heat recovery—HVAC cooling mode with auxiliary heat rejection.

Referring to FIG. 13E there is diagrammatically illustrated another exemplary embodiment of a supplemental heat transfer apparatus 699 according to the present invention. Apparatus 699 is virtually identical to the construction and arrangement of apparatus 695 with the exception of 3-way valve 686, pump 687 and an optional combined heat and power generator (CHP) 688, as well as the illustrated connection lines and conduits. Apparatus 699 is described as a geothermal heater/chiller with domestic hot water heat recovery—HVAC heating mode with auxiliary heating.

Figure 14:
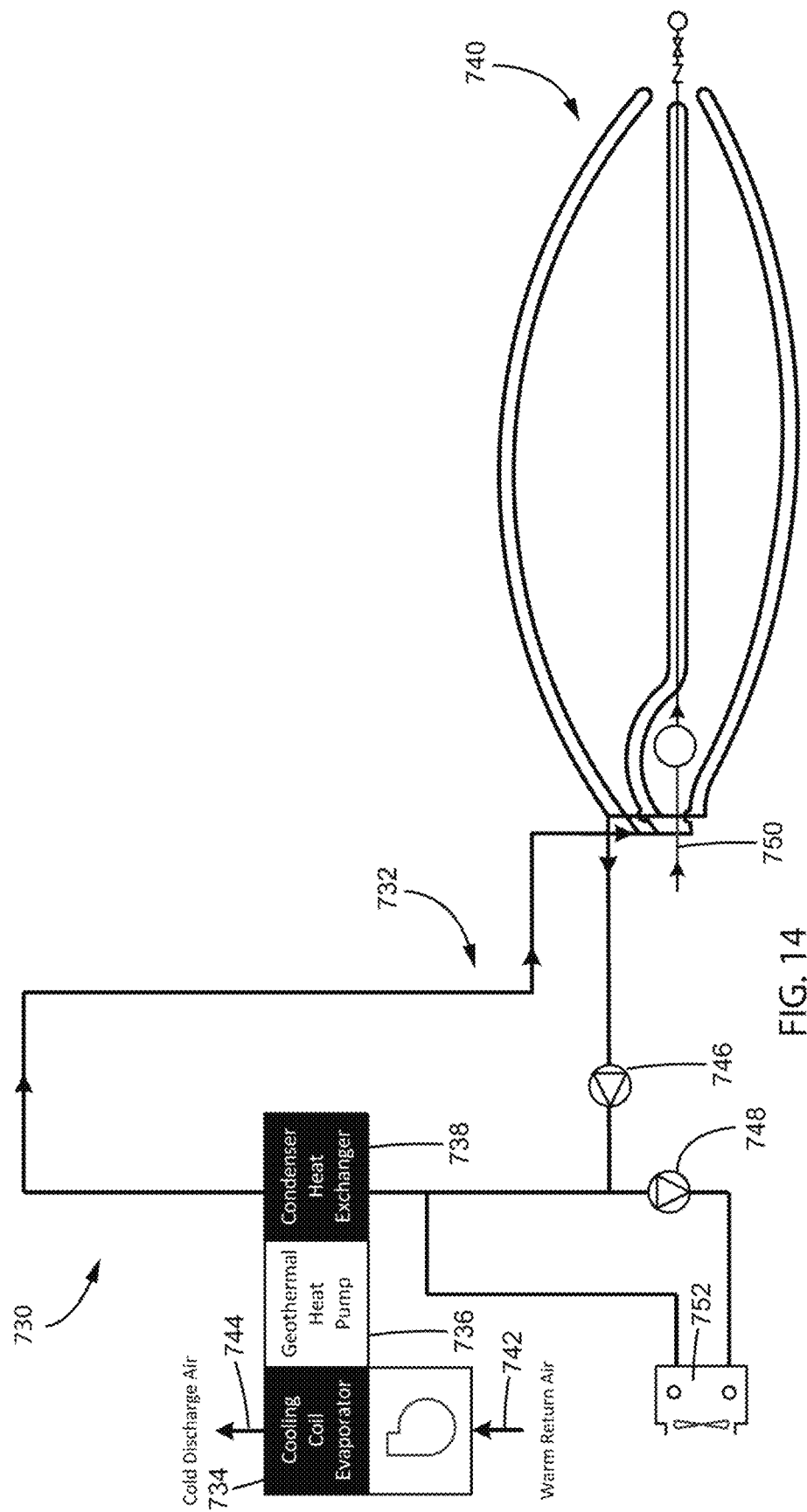
FIG. 14 is a diagrammatic illustration of another exemplary embodiment of a supplemental heat transfer apparatus according to the present invention.

Referring to FIG. 14 there is diagrammatically illustrated another exemplary embodiment of a supplemental heat transfer apparatus 730 according to the present invention. Apparatus 730 is best described as a geothermal water to air heat pump—HVAC cooling mode. FIG. 14 represents one exemplary embodiment for this described apparatus and capability.

Apparatus 730 includes a network 732 of conduit lines and pumps. Also included as a part of apparatus 730 is a cooling coil evaporator 734, geothermal heat pump 736 and condenser heat exchanger 738. The geothermal heat pump 736 is a compressor-based water to air geothermal heat pump. Network 732 is in flow communication with geothermal loop 740 which is part of apparatus 730. The cooling coil evaporator 734 receives warm return air (arrow 742) and discharges cold air to the building, residence or structure for HVAC cooling (arrow 744).

Pump 746 is associated with the geothermal loop 740 and is positioned between the geothermal loop 740 and other portions of network 732. Pump 748 is an auxiliary heat rejection pump. Conduit 750 is used for wastewater discharge from the corresponding building, residence or structure. One option which is included as a part of apparatus 730 and is associated with pump 748 is unit 758 which provides auxiliary dry or adiabatic air source heat rejection.

The illustrated and described embodiment of apparatus 730 includes as an important structural part of the described geothermal loop 740 a wastewater discharge conduit 750 running from the corresponding building, residence or similar structure. Wastewater discharge conduit 750 constitutes a pressure sewer line which is a part of a pressure sewer system and is pumped to the existing municipal sewer line or system. As described herein, a pressure sewer system creates a wastewater flow which essentially fills the cross-sectional area of the conduit, such as conduit 750.

With the conduit filled with wastewater due to the "pressure" pumping, there is direct contact by the wastewater with essentially the entirety of the inner surface of the conduit. This contact assures efficient heat transfer from the exterior surface of the conduit for use as a part of the described geothermal loop 740. This higher level of heat transfer due to having a filled conduit as compared to that of a gravity system, is important to the efficiency and effectiveness of the geothermal loop 740 in being able to achieve energy efficiencies and savings.

Figure 15:
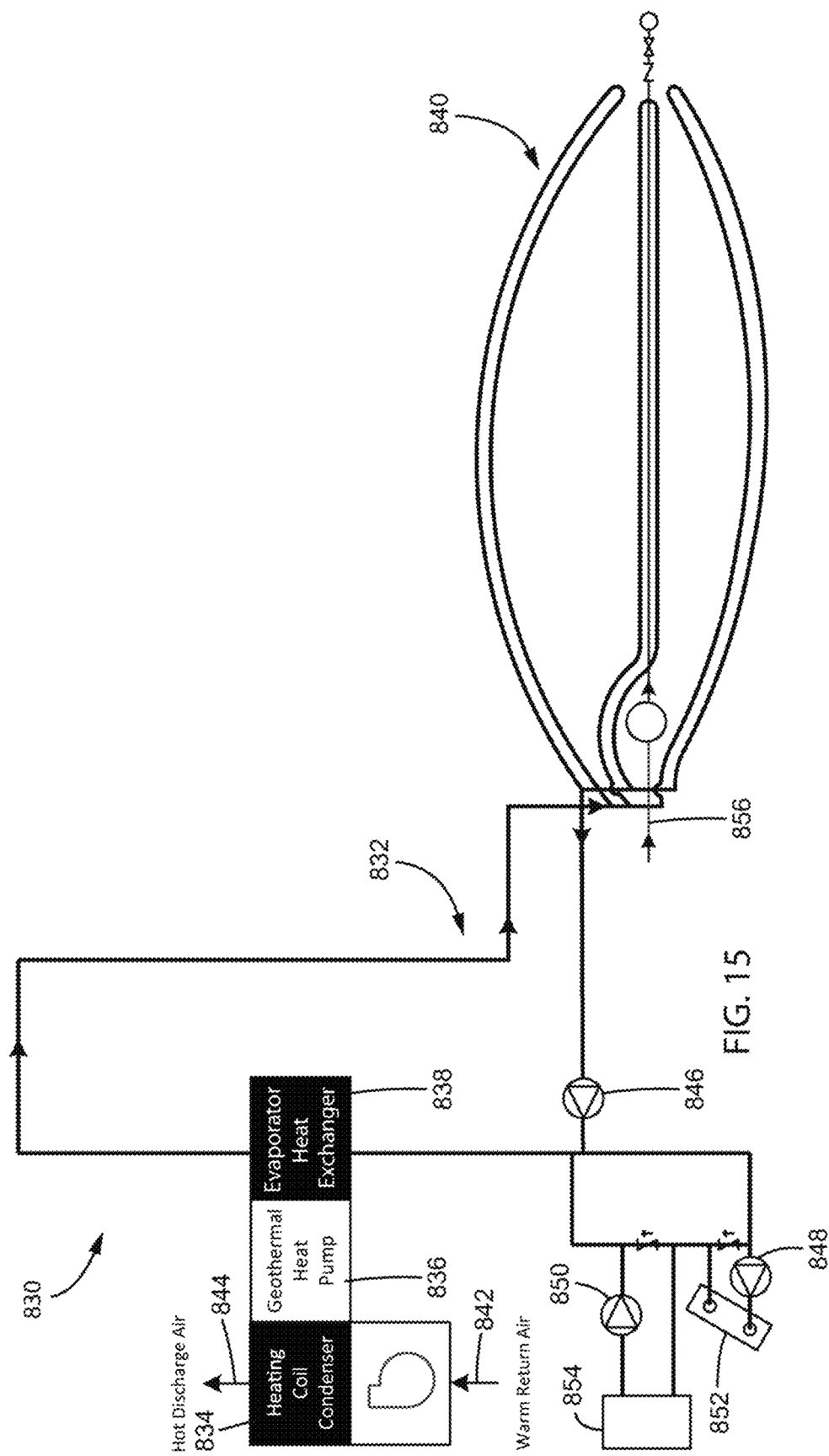
FIG. 15 is a diagrammatic illustration of another exemplary embodiment of a supplemental heat transfer apparatus according to the present invention.

FIG. 14 shows a traditional geothermal water source heat pump that uses a water to air refrigerant reversing valve to either send the hot discharge gas from the compressor to the geo loop heat exchanger for cooling or to the air source fan coil for heating (FIG. 15). Also illustrated is the auxiliary heat rejecter which is used in this cooling system and which could keep the loop in the proper lower temperature limit operating range required for geothermal water source heat pumps.

Referring to FIG. 15 there is diagrammatically illustrated another exemplary embodiment of a supplemental heat transfer apparatus 830 according to the present invention. Apparatus 830 includes a network 832 of conduit lines and pumps. Also included is a part of apparatus 830 is a heating coil condenser 834, geothermal heat pump 836 and cooling coil evaporator 838. The geothermal heat pump 836 is a compressor based water to air geothermal heat pump. Network 832 is in flow communication with geothermal loop 840 which is part of apparatus 830. The heating coil condenser 834 receives warm return air (arrow 842) and discharges hot air to the building, residence or structure for HVAC heating (arrow to 844).

Pump 846 is associated with the geothermal loop 840 and is positioned between the geothermal loop 840 and other portions of network 832. Pump 848 is the solar thermal pump. Pump 850 is the boiler primary pump. Also included as a part of apparatus 830 are optional solar panels 852 and an optional ancillary boiler 854, each being a heat source. Conduit 856 is used for wastewater discharge from the corresponding building, residence or structure.

The illustrated and described embodiment of apparatus 830 includes as an important structural part of the described geothermal loop 840 a wastewater discharge conduit 856 running from the corresponding building, residence or similar structure. Wastewater discharge conduit 856 constitutes a pressure sewer line which is a part of a pressure sewer system and is pumped to the existing municipal sewer line or system. As described herein, a pressure sewer system creates a wastewater flow which essentially fills the cross-sectional area of the conduit, such as conduit 856.

With the conduit filled with wastewater due to the "pressure" pumping, there is direct contact by the wastewater with essentially the entirety of the inner surface of the conduit. This contact assures efficient heat transfer from the exterior surface of the conduit for use as a part of the described geothermal loop 840. This higher level of heat transfer due to having a filled conduit as compared to that of a gravity system, is important to the efficiency and effectiveness of the geothermal loop 840 in being able to achieve energy efficiencies and savings.

Figure 16:
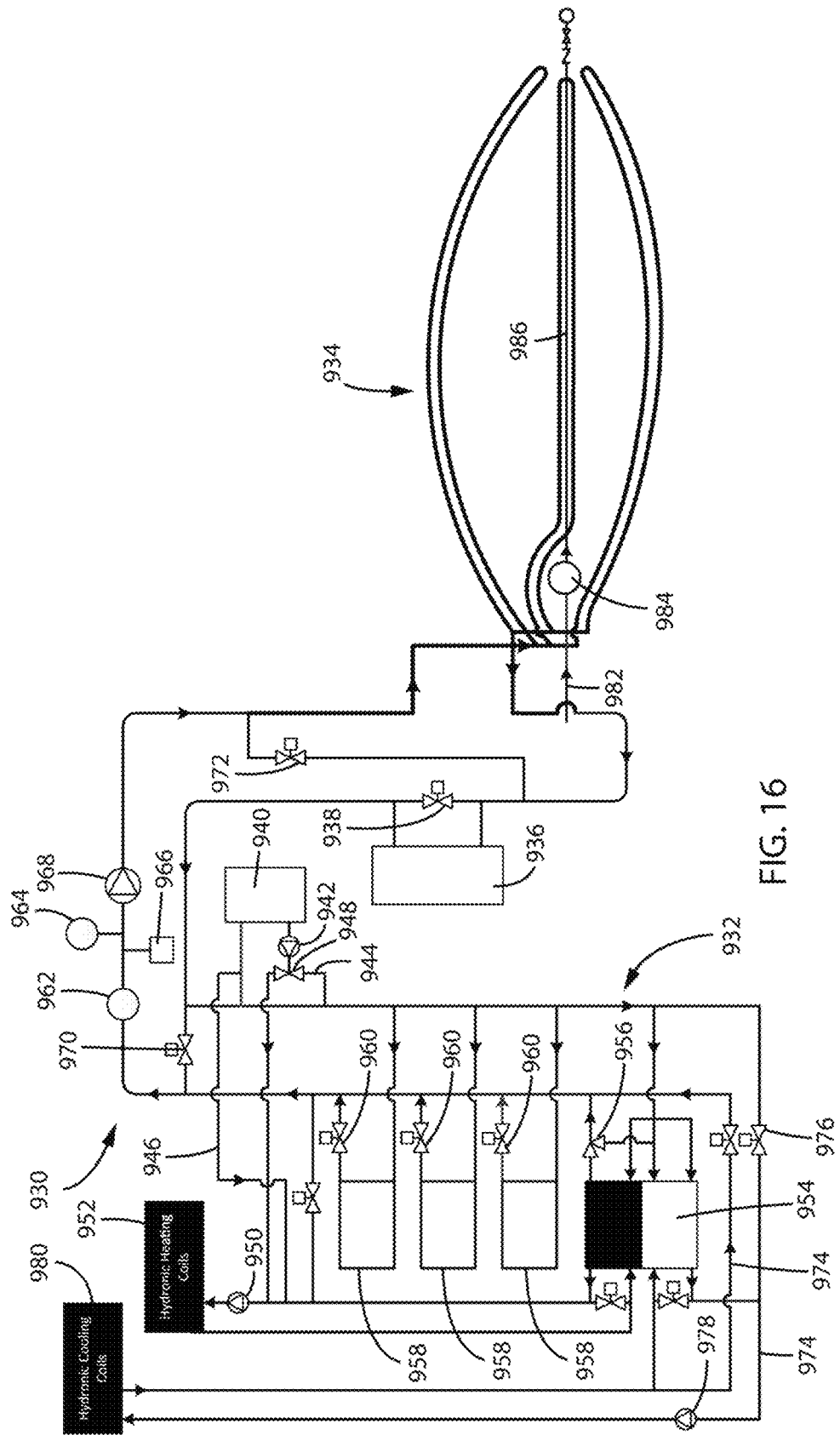
FIG. 16 is a diagrammatic illustration of another exemplary embodiment of a supplemental heat transfer apparatus according to the present invention.

Referring to FIG. 16 there is diagrammatically illustrated another exemplary embodiment of a supplemental heat transfer apparatus 930 according to the present invention. Apparatus 930 is best described as a hybrid geothermal pressure sewer loop with auxiliary heat rejection and heat absorption equipment. FIG. 16 represents one exemplary embodiment for this described apparatus and capability.

Apparatus 930 includes a network 932 of conduit lines, pumps and control valves. Included as part of apparatus 930 and integrated into network 932 is a geothermal/pressure sewer loop 934. Other portions, components and equipment which are part of apparatus 930 include the following:

a) an optional wet or dry fluid cooler 936 with and ON/OFF flow diverting valve 938;

b) an optional condensing boiler 940 with a boiler circulating pump 942, a line 944 for adding heat to geothermal loop 934 and a line 946 in cooperation with control valve 948 and pump 950 for adding heat directly to AHU heating coils 952;

c) water-to-water reversing loop chiller 954 with heater/chiller isolation and flow control valve(s) 956; with appropriate modifications, item 954 could be a water-to-water source heat pump.

d) VRF/VRV geothermal (water-cooled) heating/cooling units 958 each with an isolation and flow control valve 960; as an optional construction units 958 could be water-to-air water source heat pumps.

e) an air and dirt separator 962;

f) an expansion tank 964;

g) an auto glycol feed tank 966;

h) simplex or duplex pumps 968 with VFD and optimized control logic;

i) an optional bypass valve 970 for nighttime "cool storage" using wet cooler to pre-cool the geothermal loop 934;

j) an optional bypass valve 972 for the geothermal loop; and k) an optional "loop to load" flow conduit 974 using the geothermal loop 934 and/or wet/dry cooler 936 for direct sensible only "free cooling", including an isolation valve 976 with flow control pump 978 which is in flow communication with hydronic cooling coils 980.

The illustrated and described embodiment of apparatus 930 includes as an important structural part of the described geothermal loop 934 a wastewater discharge conduit 982 running from the corresponding building, residence or similar structure. Also included is a pump 984. Wastewater discharge conduit 982 constitutes a pressure sewer line which is a part of a pressure sewer system and is pumped to the existing municipal sewer line or system. As described herein, a pressure sewer system creates a wastewater flow which essentially fills the cross-sectional area of the conduit, such as conduit 986.

With the conduit filled with wastewater due to the "pressure" pumping, there is direct contact by the wastewater with essentially the entirety of the inner surface of the conduit. This contact assures efficient heat transfer from the exterior surface of the conduit for use as a part of the described geothermal loop 934. This higher level of heat transfer due to having a filled conduit as compared to that of a gravity system, is important to the efficiency and effectiveness of the geothermal loop 934 in being able to achieve energy efficiencies and savings.

FIG. 16 illustrates a number of indoor HVAC technologies that can be used with the geo loop for heating and cooling. The geo loop can supply a water-to-water heater/chiller or a water cooled VRFV/VRV or any other water cooled piece of heating and cooling equipment. Another design option is to use the auxiliary boiler or could use an auxiliary solar system directly into hydronic heating coils.

Figure 17C:
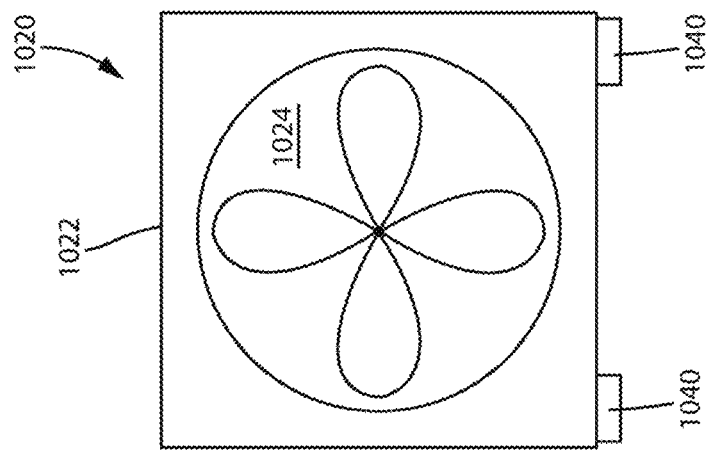
FIG. 17C is a diagrammatic illustration, as a front elevational view, of the FIG. 17A cooler.
Figure 17B:
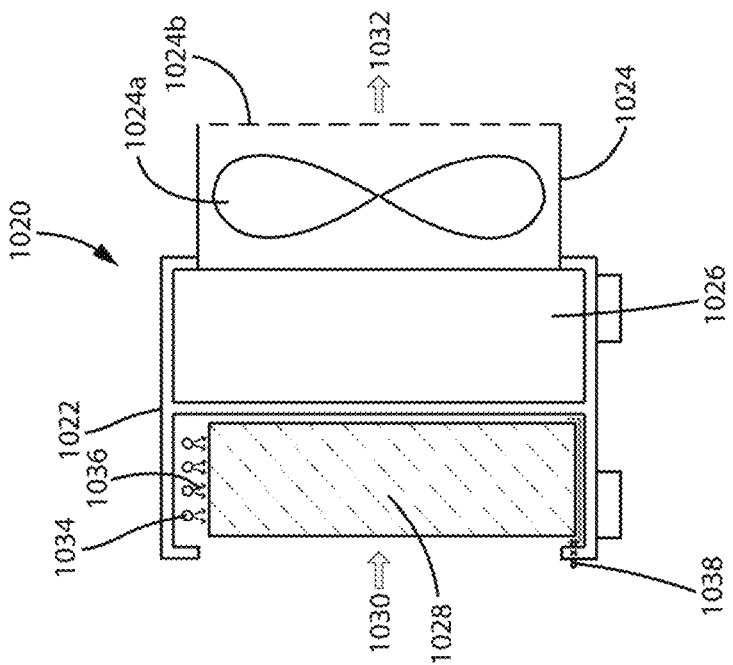
FIG. 17B is a diagrammatic illustration, as a side elevational view, of the FIG. 17A cooler.
Figure 17A:
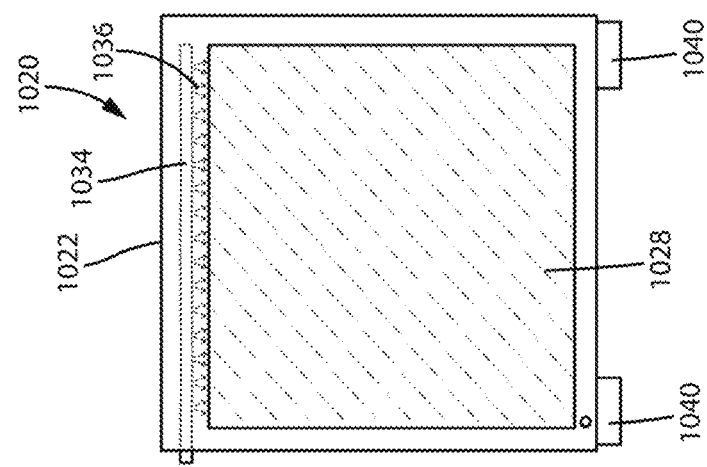
FIG. 17A is a diagrammatic illustration, as a rear elevational view, of a hybrid geothermal system heat rejection wet/dry cooler according to another exemplary embodiment of the present invention.

Referring to FIGS. 17A-17 C the illustrated apparatus 1020 is best described as a "hybrid geothermal system heat rejection wet/dry cooler", hereinafter identified as cooler 1020. Cooler 1020 is illustrated as a rear elevational view in FIG. 17A, a side elevational view, in section, in FIG. 17B, and as a front elevational view in FIG. 17C. Cooler 1020 includes the following components, structures and subassemblies:

| Item | Reference No. |
| --- | --- |
| casing | 1022 |
| fan assembly | 1024 |
| fan cylinder | 1024a |
| fan guard | 1024b |
| finned hydronic coil | 1026 |
| "wet" adiabatic precooler assembly | 1028 |
| entering ambient air | 1030 |
| discharge air | 1032 |

| Item | Reference No. |
| --- | --- |
| water inlet and manifold to supply spray water to adiabatic media | 1034 |
| manifold nozzles | 1036 |
| adiabatic catchment pan with drain to waste | 1038 |
| support feet | 1040 |

Figure 18:
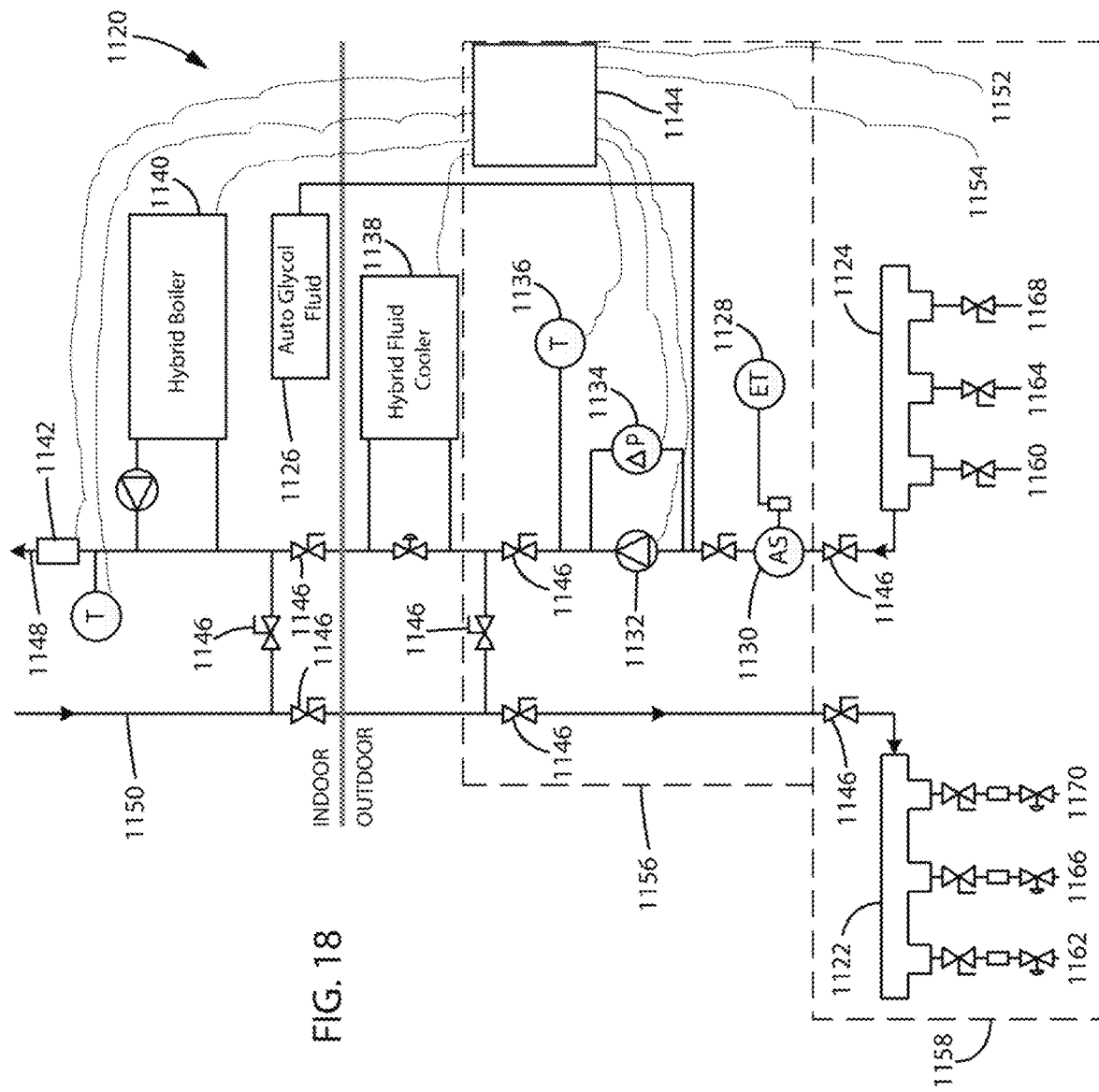
FIG. 18 is a diagrammatic illustration of a pressure sewer and geothermal loop network providing geothermal loop pumping/control according to another exemplary embodiment of the present invention.

Referring to FIG. 18, a pressure sewer and geothermal loop combination is illustrated as system 1120 which discloses a geothermal loop pumping and control. System 1120 includes the following components, structures, loops, connections and flows:

| Item | Reference No. |
| --- | --- |
| discharge from building to geo field manifold with isolation/auto flow/balance valve and flow control valves with actuator | 1122 |
| return from geo field manifold with isolation valves | 1124 |
| auto glycol feeder with low level alarm | 1126 |
| expansion tank | 1128 |
| air eliminator with auto air vent | 1130 |
| simplex pump (optional duplex pump) variable flow | 1132 |
| pressure differential switch | 1134 |
| sensor measuring loop temperature to auxiliary hybrid heating/cooling equipment | 1136 |
| optional remote mounted hybrid heat rejection cry or wet/dry fluid cooler with control valve | 1138 |
| optional hybrid boiler with pump | 1140 |
| indoor geo loop (in straight piping run) flowmeter | 1142 |
| geo loop system starter/control panel | 1144 |
| isolation and bypass valves | 1146 |
| geo loop discharge out to HVAC equipment in building | 1148 |
| return from building HVAC equipment, discharge to outdoor geo loop | 1150 |
| remote in ground or in geo vault temperature sensor(s) | 1152 |
| remote in ground or in geo vault pressure sensor(s) | 1154 |
| prepackaged control and pumping typically mounted on outside or inside wall | 1156 |
| geo loop manifolds mounted in item 1156 or optional in ground vault | 1158 |
| geo loop #1 back to building | 1160 |
| geo loop #1 out to geo field | 1162 |
| geo loop #2 back to building | 1164 |
| geo loop #2 out to geo field | 1166 |
| geo loop #3 back to building | 1168 |
| geo loop #3 out to geo field | 1170 |

Figure 19:
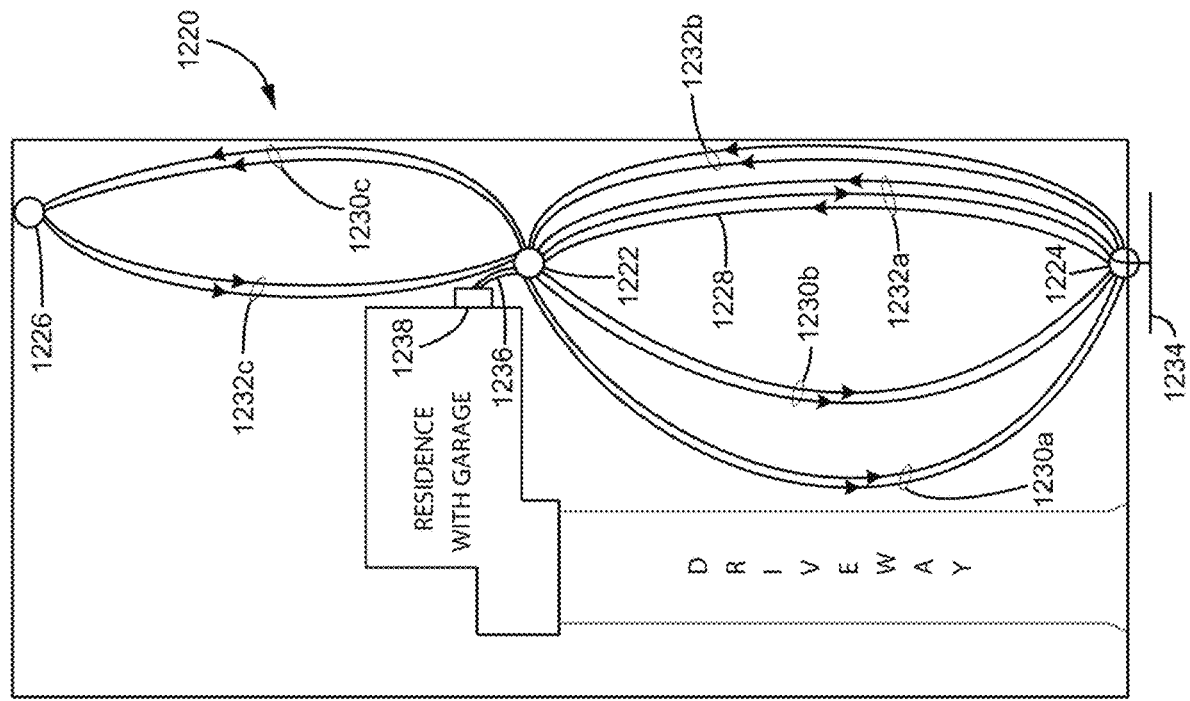
FIG. 19 is a diagrammatic illustration of a pressure sewer heat recovery with geothermal heat transfer which is specifically configured as a single pass CGX boost for a large lot system according to another exemplary embodiment of the present invention.

Referring to FIG. 19, a pressure sewer heat recovery system 1220 is illustrated. System 1220 includes a geothermal heat transfer construction and capability. The specific embodiment of FIG. 19 is further defined and described as a "single pass CGX boost large lot system". For system 1220 the following size parameters are applicable:
lot size: 150 feet W by 300 feet L
45,000 square feet, 1.03 acres
residence: 4000 square feet, two-story
pressure sewer lateral: 150 feet L/1¼ inches D (single pass)
horizontal geothermal pipe: 1800 feet L/1¼ inches D
(3) 600 foot L loops A, B and C
horizontal geothermal pipe: 6 ton cooling capacity
With continued reference to FIG. 19, system 1220 includes the following features, structures, constructions, components and flow loops:

| Item | Reference No. |
| --- | --- |
| E/one pump station and excavation for geothermal horizontal boring | 1222 |
| curb stop and excavation for geothermal | 1224 |
| excavation for geothermal | 1226 |
| pressure sewer lateral interfaced with heat transfer | 1228 |
| duplex geothermal heat transfer: outbound (A, B, C) | 1230a, 1230b, 1230c |
| duplex geothermal heat transfer: inbound (A, B, C) | 1232a, 1232b, 1232c |
| pressure sewer main/branch piping connection to curb stop and lateral | 1234 |
| loop main piping to item 1238 residence | 1236 |
| wall-mounted geothermal piping and control interface | 1238 |

Figure 20:
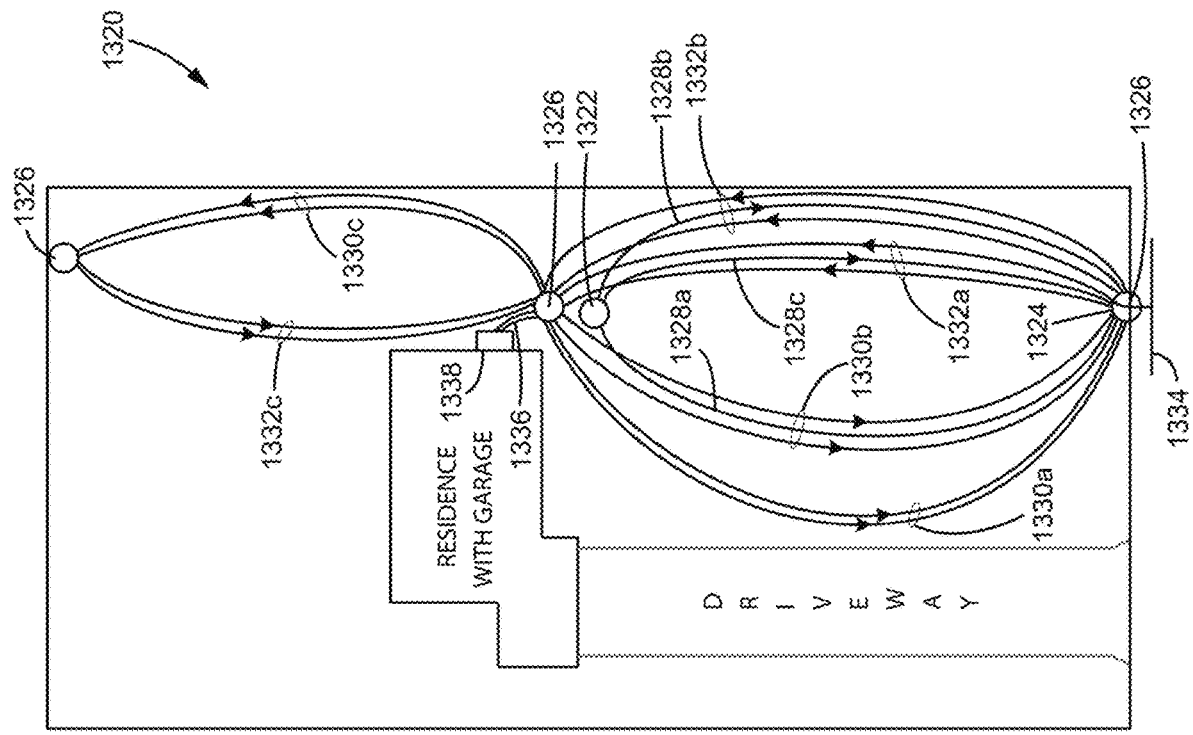
FIG. 20 is a diagrammatic illustration of a pressure sewer heat recovery with geothermal heat transfer which is specifically configured as a three pass CGX boost for a large lot system according to another exemplary embodiment of the present invention.

Referring to FIG. 20, a pressure sewer heat recovery system 1320 is illustrated. System 1320 includes a geothermal heat transfer construction and capability. The specific embodiment of FIG. 20 is further defined and described as a "three pass CGX boost large lot system". For system 1320 the following size parameters are applicable:
lot size: 150 feet W by 300 feet L
45,000 square feet, 1.03 acres
residence: 4000 square feet, two-story
pressure sewer lateral: 150 feet L/1¼ inches D (three pass)
horizontal geothermal pipe: 1800 feet L/1¼ inches D
(3) 600 foot L loops A, B and C
horizontal geothermal pipe: 6 ton cooling capacity
With continued reference to FIG. 20, system 1320 includes the following features, structures, constructions, components and flow loops:

| Item | Reference No. |
| --- | --- |
| E/one pump station and excavation for geothermal horizontal boring | 1322 |
| curb stop and excavation for geothermal - optional in ground vault | 1324 |
| excavation for geothermal - optional in ground vault | 1326 |
| pressure sewer lateral interfaced with heat transfer (A, B, C) | 1328a, 1328b, 1328c |
| duplex geothermal heat transfer: outbound (A, B, C) | 1330a, 1330b, 1330c |
| duplex geothermal heat transfer: inbound (A, B, C) | 1332a, 1332b, 1332c |
| pressure sewer main/branch piping connection to curb stop and lateral | 1334 |
| loop main piping to item 1338 and residence | 1336 |
| wall mounted geothermal piping and control interface | 1338 |

Figure 21:
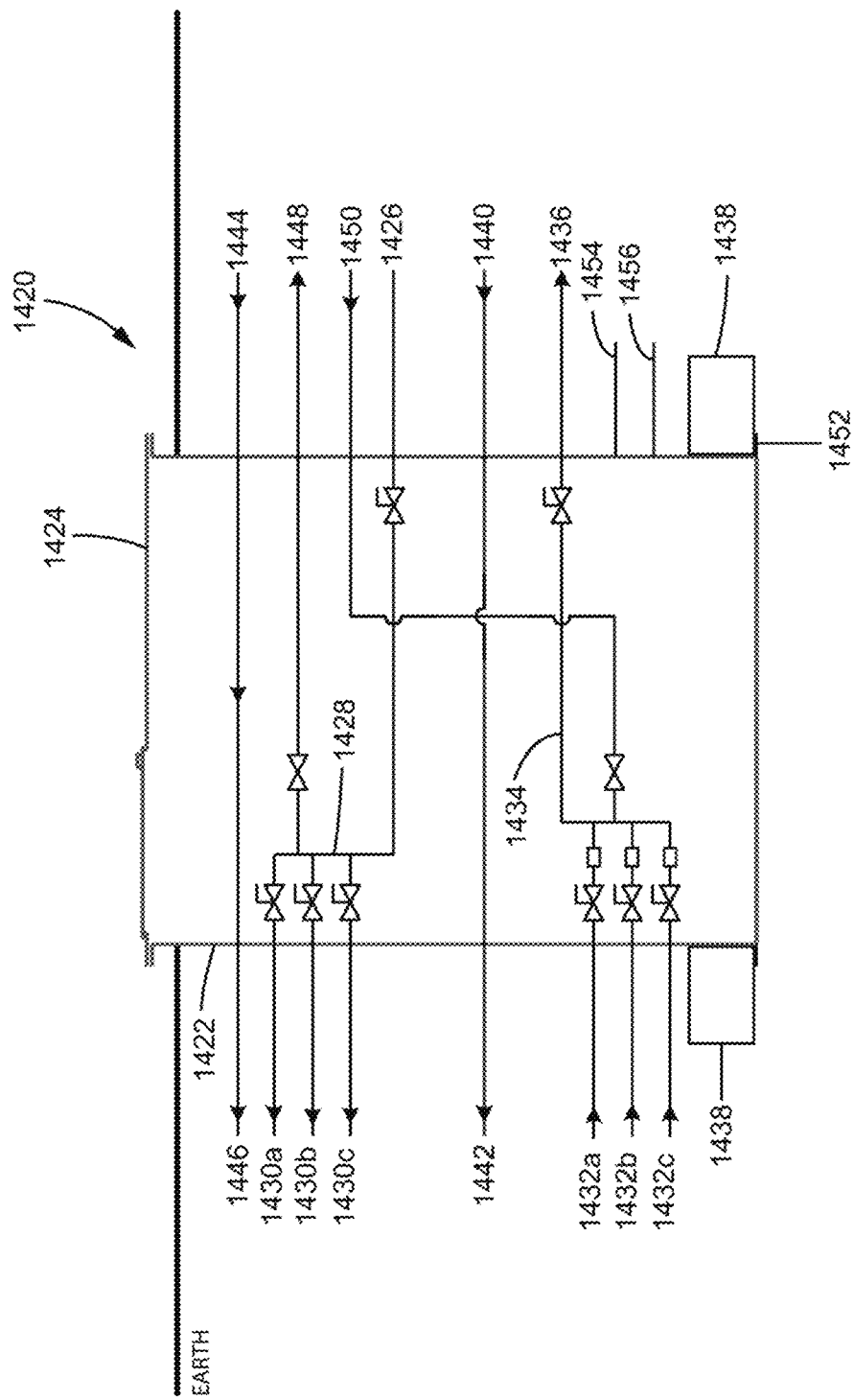
FIG. 21 is a diagrammatic illustration of a portion of a pressure sewer and geothermal loop focusing on inground piping and control vault according to another exemplary embodiment of the present invention.

Referring to FIG. 21, there is illustrated a pressure sewer and geothermal loop combination. The illustrated system 1420 is connected to an inground piping and control vault construction. The flow network associated with system 1420 includes the illustrated flows, in and out, controlled by the illustrated valving.
System 1420 has the following flows, connections, valves, controls and components:

| Item | Reference No. |
| --- | --- |
| in ground tank with piping, valving and control | 1422 |
| cover with access hatch | 1424 |
| return main from building | 1426 |

-continued

| Item | Reference No. |
|---|---|
| geo supply manifold to HVAC inlet | 1428 |
| manifold with isolation valve and flow control | 1430a |
| manifold with isolation valve and flow control | 1430b |
| manifold with isolation valve and flow control | 1430c |
| manifold with isolation and flow control visits | 1432a |
| manifold with isolation and flow control visits | 1432b |
| manifold with isolation and flow control visits | 1432c |
| geo outlet to building HVAC | 1434 |
| HVAC equipment geo supply | 1436 |
| site installed concrete ballast | 1438 |
| discharge from grinder pump station outlet | 1440 |
| pressure sewer discharge from vault bundled in ground with items 1430 and 1432 | 1442 |
| optional typical of rainwater, reuse water, potable water, solar thermal water pipe with geo loop for heat recover and geothermal loop | 1444 |
| optional rainwater discharge from vault | 1446 |
| optional discharge from solar thermal (winter) or hybrid cooler (summer) to use geo loop inlet for warm (winter) and cool (summer) storage | 1448 |
| optional geo loop outlet to solar thermal hybrid cooler inlet | 1450 |
| integral cement flange of vault | 1452 |
| port for power wiring | 1454 |
| port for data/communication/control wiring | 1456 |

Figure 22:
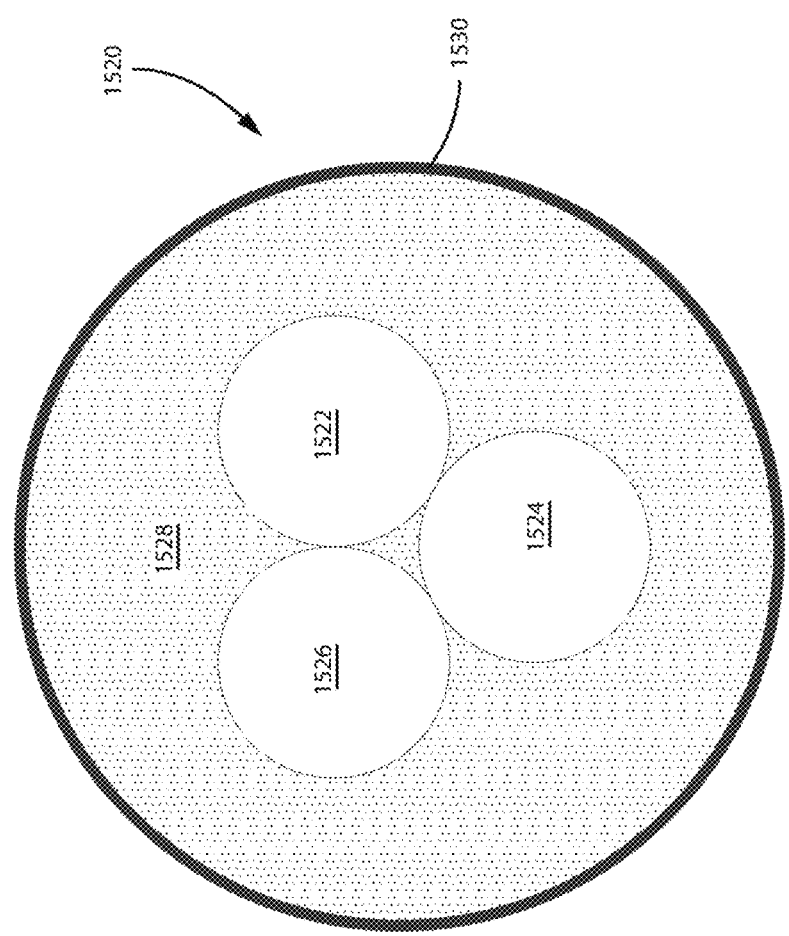
FIG. 22 is a diagrammatic illustration of a linear coaxial heat exchanger for potable and non-potable water, specifically process and waste water heating or cooling according to another exemplary embodiment of the present invention.

Referring to FIG. 22 another variant on the FIG. 5 construction is illustrated. Arrangement 1520 provides a suitable construction for a linear coaxial heat exchanger for potable and non-potable water related to process and waste water heating or cooling. FIG. 22 heat exchanger can also be used for large building and industrial heat transfer/heat recovery. Arrangement 1520 includes the following elements:

| Element | Reference No. |
|---|---|
| fluid to be heated or cooled | 1522 |
| heat transfer fluid supply | 1524 |
| heat transfer fluid return | 1526 |
| closed cell insulation | 1528 |
| solid casing/waterproof | 1530 |

The tube containing the fluid to be heated or cooled 1522 may be connected to utilities such as a pressure sewer system. Notably, in a pressure sewer system the grinder pump "conditions" lumpy wastewater into a slurry by chipping the solids into smaller pieces (e.g., having an average maximum diameter of ⅛ of an inch or less). Other utilities can supply geothermal boost capacity such as potable water, reuse water, sump pump discharge water, and/or rain water.

The heat exchanger can be designed to transfer heat into or out of "conditioned" wastewater to provide geothermal boost capacity. Alternatively, it can be used to add heat to sewage/wastewater to improve wastewater treatment performance in cold climates.

Selected Features of the Present Invention

1. A geothermal energy transfer system that is installed in the same horizontal bore hole with potable city water service piping and wastewater lateral piping connecting to the utility.
2. FIG. 1A shows a typical pressure sewer grinder pump installation transferring discharge wastewater from a residence to the utility mains. This includes a pumped pressure sewer discharge pipe for outflow from the grinder station and associated valves.
3. In FIG. 1B the geothermal loop piping is installed at the same time and in the same bore hole with the pressure sewer piping. Also included are the geothermal piping, pumping, control valves and associated indoor HVAC equipment.
4. FIG. 5 outlines a cross section view of the soil surrounding the horizontally bored pressure sewer pipe and geothermal supply and return piping systems.
5. FIG. 2 shows both a geothermal loop with boost from the pressure sewer and with non-boosted, horizontally bored geothermal pipe.
6. FIG. 7 shows multiple utility infrastructure boosts including pressure sewer lateral boost and onsite rainwater capture boost for the geothermal system. The additional boosts in conjunction with geothermal loop can be the potable water, reuse water, district heating (low temperature), and district cooling. The geothermal loop can be installed at the same time as horizontally bored natural gas lines for a non-thermal boost piping.
7. FIG. 8 shows the geothermal loop using both pressure sewers with city water for boost and, when available, reuse water for thermal boost. All utility and geothermal piping should be installed below frost line for the area. Pressure sewers typically use 1.25 inch ID pipe and horizontal boring.
8. FIG. 9 expands the heat recovery concept from pressure sewer wastewater lateral piping to include the pressure sewer main and branch piping installed by streets and in easement. This piping is in proximity to the grinder pump station and its discharge lateral piping and interconnects to larger pressure sewer main piping or the gravity/lift station/force main piping and transfer the discharge to wastewater treatment plants.
9. FIG. 6 and FIG. 3. For additional thermal efficiency pressure sewer and geothermal lines should be horizontally bored at a depth of at least 96 inches. This will assure a more stable winter/summer soil temperature for heat transfer.
10. FIG. 10 and FIG. 11 incorporate the in ground geothermal loop of FIG. 2 with the in-building utilities for a hydronic HVAC system for heating, cooling and domestic hot water production.
11. FIG. 12 and FIGS. 13A and 13B add ancillary heating and cooling equipment to boost the efficiency and supplement the geothermal loop.

In addition to all of the systems, networks and arrangements already illustrated and disclosed, the concepts taught by the exemplary embodiments could include additional lines such as electrical lines and/or communication/data lines. These additional lines can be run and installed as a part of the horizontal boring technique/method which is disclosed herein and which may be used for the exemplary embodiments.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:
1. A supplemental heat transfer apparatus for a structure comprising:
a pressure sewer system associated with said structure and having a wastewater conduit for removal of wastewater from said structure; and a geothermal system, constructed and arranged in cooperation with said structure, having at least one geothermal loop for circulating a heat transfer fluid; and wherein said wastewater conduit and said geothermal loop have separate conduit walls positioned alongside one another in a common bore hole so as to be arranged in proximity to each other to effect heat transfer between said wastewater conduit and said geothermal loop;

wherein said conduit wall of said wastewater conduit has an inner surface and an outer surface and a thickness between said inner surface and said outer surface; and wherein said conduit wall of said geothermal loop is positioned outside of said thickness of said conduit wall of said wastewater conduit.

2. The supplemental heat transfer apparatus of claim 1 wherein said pressure sewer system further includes a grinder station and a grinder pump.

3. The supplemental heat transfer apparatus of claim 1 wherein said geothermal system includes a supply conduit and a return conduit.

4. The supplemental heat transfer apparatus of claim 3 wherein said geothermal system further includes a pump.

5. The supplemental heat transfer apparatus of claim 4 wherein said geothermal system further includes a control interface with said structure.

6. The supplemental heat transfer apparatus of claim 1 which further includes a plurality of geothermal loops.

7. The supplemental heat transfer apparatus of claim 6 wherein each geothermal loop includes a supply conduit and a return conduit.

8. The supplemental heat transfer apparatus of claim 6 wherein each geothermal loop has a common connection to a pump.

9. The supplemental heat transfer apparatus of claim 1 wherein said geothermal system includes two geothermal loops each with a supply conduit and a return conduit, said supply conduits and said return conduits being arranged in a four-corners pattern around said wastewater conduit.

10. The supplemental heat transfer apparatus of claim 1 wherein said geothermal loop includes a supply conduit and a return conduit which are arranged with said wastewater conduit in the common bore hole.

11. The supplemental heat transfer apparatus of claim 10 wherein said common bore hole includes a heat transfer grout.

12. The supplemental heat transfer apparatus of claim 1 which further includes a rainwater system which is constructed and arranged to capture rainwater coming off of the structure.

13. The supplemental heat transfer apparatus of claim 12 wherein said rainwater system includes rainwater conduits which are integrated with said geothermal loop.

14. A supplemental heat transfer apparatus for a structure comprising:

a pressure sewer system associated with said structure and having a wastewater conduit for removal of wastewater from said structure; and a geothermal system, constructed and arranged in cooperation with said pressure sewer system, having a plurality of geothermal loops for circulating a heat transfer fluid, each geothermal loop of said plurality having a supply conduit and a return conduit; and wherein said wastewater conduit and said geothermal system have separate conduit walls arranged in proximity to each other in a common bore hole to effect heat transfer between said wastewater conduit and said geothermal system; and wherein said conduit wall of said wastewater conduit has an inner surface and an outer surface and a thickness between said inner surface and said outer surface; and wherein said conduit wall of said geothermal system is positioned radially outward of said thickness of said conduit wall of said wastewater conduit.

15. The supplemental heat transfer apparatus of claim 14 wherein said geothermal system further includes a pump.

16. The supplemental heat transfer apparatus of claim 15 wherein each geothermal loop has a common connection to said pump.

17. The supplemental heat transfer apparatus of claim 16 wherein said geothermal system further includes a control interface with said structure.

18. The supplemental heat transfer apparatus of claim 17 wherein at least one supply conduit and at least one return conduit are arranged with said wastewater conduit in the common bore hole.

19. The supplemental heat transfer apparatus of claim 18 wherein said common bore hole includes a heat transfer grout.

20. The supplemental heat transfer apparatus of claim 19 which further includes a rainwater system which is constructed and arranged to capture rainwater coming off of the structure.

21. In combination:

a structure with a heating and/or cooling arrangement and an associated pressure sewer system having a wastewater conduit for removal of wastewater from said structure;

a geothermal system, constructed and arranged in cooperation with said structure, having at least one geothermal loop for circulating a heat transfer fluid; and wherein said wastewater conduit and said geothermal loop have separate conduit walls positioned alongside one another in a common bore hole so as to be arranged in proximity to each other to effect heat transfer between said wastewater conduit and said geothermal loop;

wherein said conduit wall of said wastewater conduit has an inner surface and an outer surface and a thickness between said inner surface and said outer surface; and wherein said conduit wall of said geothermal loop is positioned outside of said thickness of said conduit wall of said wastewater conduit.

22. The combination of claim 21 which further includes an indoor water-to-water heater/chiller.

23. The combination of claim 21 which further includes a heat exchanger to recover heat from a condenser.

24. The combination of claim 21 which further includes a closed circuit air or adiabatic fluid cooler.

25. The combination of claim 21 which further includes a two-coil heat exchanger.

26. The combination of claim 21 which further includes a pump and a dry or adiabatic fluid cooler.

27. The combination of claim 21 which further includes a control valve and pump.

28. The combination of claim 21 which further includes a combined heat and power generator (CHP).

29. The combination of claim 21 which further includes a control valve for a dry or adiabatic cooler.

* * * * *